United States Patent [19]

Norris, III

[11] Patent Number: 5,521,663
[45] Date of Patent: May 28, 1996

[54] SOUND SYSTEM FOR STILL FILM PHOTOGRAPHY

[76] Inventor: Wyamn J. Norris, III, 4285 Payne Ave., San Jose, Calif. 95117

[21] Appl. No.: 279,227

[22] Filed: Jul. 22, 1994

Related U.S. Application Data

[63] Continuation-in-part of Ser. No. 967,726, Oct. 28, 1992, abandoned.

[51] Int. Cl.$^6$ .......................... G03B 17/24; G03B 31/02
[52] U.S. Cl. .................. 354/106; 352/27; 352/21
[58] Field of Search ...................... 354/76, 105, 106; 352/27, 37, 19, 21

[56] References Cited

U.S. PATENT DOCUMENTS

| | | | |
|---|---|---|---|
| 3,599,549 | 8/1971 | Diuzet | 352/37 |
| 3,650,187 | 3/1972 | Judin | 354/106 |
| 3,876,297 | 4/1975 | Appeldorn et al. | 353/19 |
| 4,215,920 | 8/1980 | Butler | 354/105 |
| 4,223,463 | 9/1980 | Good | 40/158 |
| 4,600,280 | 7/1986 | Clark | 352/37 |
| 4,665,004 | 5/1987 | Drexler | 354/106 |
| 4,732,476 | 3/1988 | Sweeney | 353/25 |
| 4,905,029 | 2/1990 | Kelley | 354/76 |
| 4,983,996 | 1/1991 | Kinoshita | 354/76 |
| 5,128,700 | 7/1992 | Inoue et al. | 354/76 |

*Primary Examiner*—Michael L. Gellner
*Assistant Examiner*—Jae N. Noh

[57] ABSTRACT

A film camera for recording visual images is adapted to record sound accompanying a photographic event onto the film section used for the visual image of such event. This audio recording is accomplished with light, immediately or at any time prior to taking the next photograph. The audio recording is accomplished without substantial intrusion into the photographic image. This system utilizes the film, processing, and printing currently available to the consumer or amateur photographer. The film camera captures and stores sound in a digital binary form then imprints this binary code onto film in the form of black and transparent bars adjacent the actual negative light image. A reading device (110) accesses and makes audible the recorded audio from photographs. A receptacle (139) provides storage of multiple photographs and instant access to audio and visual information stored. A processor which isolates and monitors a static electrical field surrounding the photographs in the receptacle. This static field monitoring facilitates the selection of specific photographs and their respective audio segment, when the user touches a specific photograph, thereby interrupting that field.

19 Claims, 12 Drawing Sheets

SOUND SYSTEM FOR STILL FILM PHOTOGRAPHY

BACKGROUND — CROSS REFERENCE TO RELATED APPLICATION

This is a continuation in part of application Ser. No. 07/967,726, filed Oct. 28, 1992 abandoned.

BACKGROUND — FIELD OF INVENTION

This invention relates to snapshot or still film photography, specifically to the inclusion of sound with still photographs. Sound captured from each photographic opportunity is conveniently captured, and efficiently and permanently stored on the film itself.

BACKGROUND — DISCUSSION OF PRIOR ART

Heretofore still cameras were designed and are used primarily to capture and preserve visual images. The primary purposes of this visual preservation are documentation, story telling, and memory stimulation.

Much has been done since the introduction of still photos to improve the visual image. Automatic exposure setting, automatic flash, automatic film advance, and more specialized films all aid in this improvement.

Although these have improved visual images, very little has been accomplished to improve the ability of images to better satisfy their basic purposes or end results, which are as follows:

DOCUMENTATION: Millions of photographs each year depict events or situations that quickly turn into vague or nonexistent memories. Because we are not aware of any means by which to improve this, we often settle for vague memories as adequate documentation. In using photographs, the documentation is only as strong as the memories supporting them.

STORY TELLING consists of someone remembering what is in the photo, and explaining to someone else what they are seeing. The adage that "every picture tells a story" is not completely accurate. More accurately the adage is: "people tells stories, occasionally aided by visual images".

MEMORY STIMULATION means that if one can remember who is in the picture, or where they were when it was taken, they're doing pretty well. These memories quickly fade, and rarely do we remember feelings, emotions, or thoughts from the experiences — just the occasion.

A visual image reinforced with sound from the occasion will greatly enhance the photograph's features of documentation, story telling, and memory stimulation. The need for this enhancement is quite evident by the popularity of home video as a recording format.

With the introduction of home video cameras, many thought still photography would soon be a thing of the past. Although the video camera did replace many home movie cameras, video cameras and cassettes are too bulky, awkward, tempermental, expensive, and confusing to be considered convenient for the average user. The biggest encumbrance of all is that a television monitor is necessary for this format to be appreciated by more that one person at a time.

Furthermore, the magnetic recording tape itself can be accidentally erased by a magnetic field and begins to "print through" and deteriorate after just a few years. These characteristics make magnetic recordings but a temporary memorial.

There have been attempts to add audio to photographic images. They comprised a magnetic strip or tape attached to the photograph or slide/frame.

There are difficulties associated with these "soundpictures" which make them impractical and inconvenient. They require separate recording media for photo and audio, and a means to attach the two. Whether done in the manufacturing facility, or in the processing lab or by the user, this attaching introduces at least one additional process, along with associated costs.

Furthermore, if the audio to be attached to the photos is recorded at the same time as the photo, then it must be identified and kept safe until the photo prints are complete. The likelihood is very great that one will misplace the audio and inadvertently combine the wrong audio with a picture. This handling of magnetic recordings creates additional problems associated with this type of audio inclusion.

Duplication of these magnetic recordings requires special equipment. And the entire process must be repeated for each duplication. Mass duplication can be very costly, prohibiting its use for such things as photo greeting cards.

As mentioned previously, the magnetic recording medium itself is inherently inferior to film. It has a much shorter lifespan and the information stored can only be considered temporary. Magnetic recording can be disrupted and completely erased by the presence of another magnetic field. With these systems, not only will the user need to avoid placing photos in the light to prevent fading, they will also have to cope with a new, invisible danger — unwanted magnetism. Thus the user must avoid setting photos on or near speakers, televisions, computers, or anything else which may emit a magnetic field.

Furthermore, since the magnetic information is on the surface, it is susceptible to scratches and other physical damage. Thus a jacket or sleeve must be used to help protect the audio information. This protective sleeve must be removed to access the audio information, since any material on the magnetic surface diffuses the signal and makes it virtually unreadable. This vulnerability and subsequent protection runs counter to convenient use.

Another attempt to combine audio with still photography involves embedding a microchip within the photographic print. This is a very complicated means of accomplishing audio inclusion. Here also, the audio must be captured on a different medium and stored separately from the visual image, and then combined properly when the print is to be viewed.

The audio cannot be combined with the visual image until the photograph has been printed. This also requires manufacturing a special paper or other material onto which the photographic image must be printed or attached. This special paper or material must be capable of containing the microchip and associated hardware and circuitry to access the audio. This increases the thickness and bulk of photographs, and drastically increases the equipment requirements and the number of processes to produce a single photograph. These increases dictate overall cost increases for each photograph.

As with the aforementioned magnetic attempts, this microchip process involves very complex and costly steps to associate photographs with their respective audio segments. This process also inhibits efficient mass production of these photos and associated audio segments.

Digital audio has been included on motion picture film, e.g., as shown in Clark U. S. Pat. No. 4,600,280 (Jul. 1986).

Clark uses light transfer through a transparent recording medium to access recorded audio, but makes no provision for accessing audio from an opaque material, such as a photographic print.

Clark's system does not allow access to individual visual images and associated individual audio. In motion pictures or cinematography, audio information is recorded twenty (20) frames away from corresponding visual information, this makes Clark's system unable to transfer a single visual image with associated sound recording to a photographic print without new and complex equipment. No means for printing and accessing related audio and visual information from any single frame is described, implied or predicted.

Furthermore. Clark's system operates only when a connected series of visual images and audio fragments are quickly accessed in a sequential fashion. Clark is unable to record or playback any single image and associated sound unless it is attached to at least twenty (20) others.

Furthermore, Clark's system can record and playback audio information only through complex mechanized apparatus which is too cumbersome for personal consumer use. Clark uses a rotating polygonal mirror in the recording stage; such a mirror is very susceptible to camera movement, it can easily be momentarily pulled out of alignment by gravity and inertia. This design cannot withstand the demands and abuse of the amateur photographer.

Alignment, and rate of film pass is crucial to Clark in both the record and playback stages. Clark combines a longitudinal word with a vertical film path which he describes as being "perpendicular to the orientation of the digital word". This combination created a serious alignment problem which Clark calls "lateral wandering". Clark goes to great lengths to meticulously remedy this alignment problem. Clark teaches us a means to compensate for an alignment problem.

Furthermore. Clark's process is designed for audio recording in real-time. This allows for no preview, narration, or manipulation of the audio prior to recording unless these elements are recorded separately. The duration of audio information associated to each visual frame is 1/24 of a second at the standard motion picture rate of 24 frames per second. This system allows for multiple channels, but only for a single duration of audio information, this process makes for a very short audio recording which is unusable for the amature consumer.

Clark's system is designed for motion picture recording/playback, and could not easily or inexpensively convened to personal or still photographic use.

Diuzet, in U.S. Pat. No. 3,599,549 (Aug. 17, 1971), records visual and audio information onto optical film, however, Diuzet does not provide an invention that is efficient, practical, durable, convenient, or easily adaptable to consumer use of still photography.

Diuzet's system severely sacrifices photographic area for the recording of sound. According to Diuzet's FIG. 2, only 6.78% of the photographic area is utilized for the visual image. Additionally, viewing Diuzet's FIG. 2, efficient utilization of photographic material is not possible with this system, a significant portion of the film is unused by either the visual or audio recording.

Diuzet incorporates a rotating table which facilitates the creation of the spiral audio recording. This table must rotate either the entire load of recording film, or the entire optical recording apparatus. This table is cumbersome, delicate, and susceptible to inertia, and other forces of nature which make it unusable in the field of amateur photography. The same type of rotating apparatus must also be employed in the reading or retrieval of said audio. This table is a very delicate and precise apparatus which is costly to produce.

Diuzet states: ". . . the photographic film employed is a black and white or color film of 2.8 inches . . . " this is otherwise known as 70 mm, film which is not a size commonly available. The Diuzet system cannot be conveniently used by the amateur consumer without affording the user greater access to this size film, and this film will be an increased expense to the consumer. Furthermore, Diuzet's system the consumer must dramatically sacrifice the visual image to accommodate audio recording.

In U.S. Pat. No. 4,983,996 (Jan. 8, 1991), Kinoshita describes a hand-held wand as a reading device, illustrated in FIG. 1.

Any reliable system which incorporates a reading device reliant on the human hand for alignment, must write the information of such size as to encompass any reasonable error of the operator.

The typical deviation of a steady handed person in a single pass of the wand from start to finish across a standard five-inch photograph is approximately 0.25 inch. This information track must be twice that size, or 0.5 inch, since users will likely start the pass at the center of the track, and either deviate up, or deviate down.

For illustration purposes only, we incorporate the following simple values to calculate audio storage capacity.

A sample rate of 8000 per second (telephone quality audio), a digital word length of 4 bits, film resolution of 190 lp/mm (line pairs per millimeter), 35 mm film, and magnification factor of 3.63 to create a photographic print measuring 3.5 " H × 5 " L.

These values will allow a bar-code track five inches in length to contain approximately 0.42 seconds of audio information.

The maximum audio information that can be recorded in the manner described by Kinoshita, is 2.9 seconds per photograph. However, this audio recording completely devours the photographic image. Kinoshita's gross use of space for audio recording is counter-productive to the purpose of a photograph to record a visual image.

The recording of audio onto light sensitive film is not new, but efficient, functional and convenient recording has not been achieved until my current invention.

OBJECTS AND ADVANTAGES

Accordingly, one object and advantage of the invention is to provide a still camera which records and efficiently combines actual sound captured during the photographic event with the photograph, while maintaining the superior visual image quality of film. This camera will record sound onto film as an optical image before the next photo is taken. The combined photographic and audio recording process is such that the area dedicated to audio information is of such proportions as to not obstruct nor diminish the overall visual image. This system is capable of maximizing extremely high film resolutions. Utilizing film with a resolution of 190 lp/mm, and dedicating four line pairs for guide, and clock tracks, this system is capable of recording 186 audio tracks in a single millimeter. In a area 3.63 millimeters high (0.14 inches) along the length of the photographic print, this invention can record 78 seconds of audio information.

This efficient utilization of space far surpasses the efforts of any prior art example to record sound and visual image onto light sensitive film without sacrificing the visual image.

Several additional advantages of this process are convenience, quality, longevity, and economy. The audio information is imprinted on the photograph before the next photo is taken. This immediate imprinting eliminates the need for storage and identification of audio information prior to combining with the photograph. The photograph and associated audio recording exit the camera as one inseparable piece on one recording medium. The utilization of a single recording medium for the recording of more than one type of information eliminates the encumbrance and costs associated with combining different mediums. Also, the utilization of a single medium for this recording does not introduce new, additional hazards for the user to avoid. Furthermore, the audio information recorded with this process will also have the superior longevity and durability of photographs.

In use of this system there is no need to buy special film, special processing or papers, or assemble separate elements.

Additionally, the photographic-cum-audio recordings is easily appreciated by any number of persons in the immediate area, without the need for a television or outside components, except for those described herein.

In this present system the number of photos per roll of film remains the same as current use. Additionally, every print or duplicate of each audio photograph will have the same audio and quality as the original. The duplication of these photographs which contain sound can be accomplished using traditional processes and equipment of the photographic industry. In other words, my system is fully compatible with existing hardware and procedures.

I also provide a means to access or play the audio information contained on the film. This access is achieved without removing or damaging this information.

I further provide a storage receptacle for audio photographs, which affords convenient access to visual and audio information.

In my system the inclusion of audio is not an encumbrance, but a convenient and economical addition which can greatly enhance the impact and effectiveness of the visual image.

Still further objects and advantages will become apparent from a consideration of the ensuing description and drawings.

DRAWINGS FIGURES

FIG. 1, in accordance with the invention, shows a front view of the recording device contained within a prior-art 35 mm SLR (single-lens-reflex) camera. The broken lines indicate prior-art portions of the camera.

Figure 1:
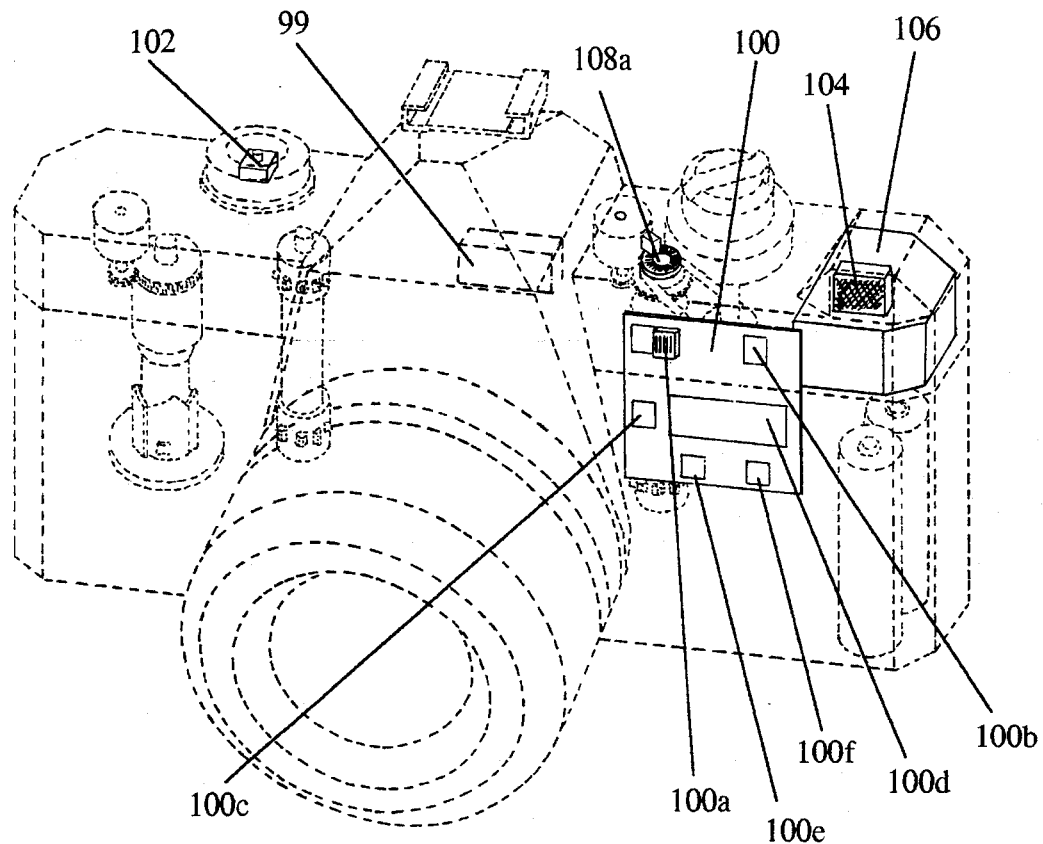

FIGS. 14A–K illustrate sequential views of a control console of a camera in accordance with the invention.

REFERENCE NUMERALS IN DRAWINGS

Camera
99 Photographic Processor, prior-art
100 Control Panel
100a Mode Switch
100b Manual Advance Button
100c Select Button
100d Display Screen
100e Multi Function Button
100f Multi Function Button
102 Shutter Button, prior-art
104 Transducer
106 Central Processing Unit
107 Exposure Barrier
108 Film Guide
108a Tachometer
109 Optical Writing Block
109a Optical Writer-Audio
109b Optical Writer-Audio
109c Optical Writer-Clock
109d Optical Writer-Guide
130 Sprocket Holes, prior-an
131 Photographic Area, prior-art
Optical Tracks
132a Optical Audio Track
132b Optical Audio Track
132c Optical Clock Track
132d Optical Guide Track
Reader Device 110
112 Optical Sensor Transport
113 Rack
114 Transport Motor
115 Pinion
116a Transport Towers
116b Transport Towers
117a Tower Bushings
117b Tower Bushings
118 Motor Controller
120 Reader Slot
122 Processor
123 Speaker
124 Multifunction On-Off/Volume/Repeat Switch 126 Tone Controller
127 Photographic Receptacle Interface Connector
127a Interface Cable
Optical Sensor Transport 112
112a Optical Sensor — Audio
112b Optical Sensor — Audio
112c Optical Sensor — Clock
112d Optical Sensor — Guide
112e Optical Sensor — Guide
133a Transport Runner
133b Transport Runner
135 Light Source
Photographic Receptacle 139
140 Solid-State Audio Storage Unit
142 Control Console
143 Processor
144 On/Off Switch
146 Volume Controller
148 Tone Controller
150 Speaker
152 Reader Interface Connector
154a–f Photo Slots (transparent photo envelopes)
156a–f Photo Slot Audio Assign Triggers

GLOSSARY

The following are definitions of terms used in the ensuing description and are provided to aid in understanding the invention.

BOTTOM: The portion of the image or photograph that is at the bottom when the camera is used in its normal attitude. If the camera is rotated 90 degrees, this portion becomes the side. If camera is inverted, this portion becomes the top.

EXPOSE: To subject to light.

EXPOSURE AREA: The film path area inside a camera that is exposed when the shutter is open.

FILM: Negative or slide material prior to photographic chemical processing.

IMAGING = WRITING = RECORDING: Storing information.

NARRATE: To record additional audio without disturbing or replacing existing audio.

NATURAL AUDIO: The audio which has occurred at the time the photograph was taken.

NEGATIVE: Exposed film that has been chemically processed to make visible the areas or portions exposed to light and the degree of this exposure. Having light, dark and hue areas opposite to those of the original photographic subject.

PHOTO = PHOTOGRAPH: A captured, recorded, or otherwise acquired form of a visual image, on film or paper.

PHOTO AREA = FRAME: The portion of film designated or photographic image within a single film quadrant.

PHOTOGRAPHY: The process of recording visual images.

PLAY: To reproduce audible or inaudible, previously recorded audio.

QUADRANT: The entire portion of film designated to a single photographic image. In addition to a photographic image, a quadrant includes such things as sprocket holes, film identification, and non-exposed areas.

REAL TIME: The actual time in which a physical process occurs.

NON-REAL TIME: A time other than the actual time at which a physical process occurs (High speed dubbing and slow motion are examples).

RECALL: To wind an exposed film quadrant back into the film canister.

SOLID-STATE: Based on or composed principally or entirely of transistors or related semiconductor devices.

SUMMARY

In accordance with the invention. I provide an apparatus and process which allows the operator of a still film camera to immediately and conveniently include sound as a portion of the photographic event. This audio inclusion is accomplished by converting an analog audio signal into a binary digital code (ONEs and ZEROs) and recording this code onto film with a series of light pulses (ONs and OFFs). The light pulses take the form of dark and transparent areas on the film. This digital audio occupies a small, insignificant portion of the photograph itself and is recorded directly adjacent to the visual image to which it applies. This audio is as permanent and durable as the photograph, and is easily played with a portable reader. To further ease display and access of these photographs containing audio, a photographic receptacle can be used. When a photograph is inserted into this receptacle, the audio from each photo is read and stored in solid-state circuitry with a unique individual address. The receptacle contains circuitry which enables the user to identify and select individual addresses, whereby any of the photos may be randomly selected and the associated audio instantly played.

Overall Description of System

A sound system for still film photography in accordance with my invention consists of three related, but separate devices. They are as follows: (1) a camera for capturing and recording audio and visual images in photographic form, (2) a reader device for accessing or playing audio information from a photograph, and (3) a photographic receptacle for storage and convenient access of photographs.

FIG. 1 — Perspective Front View of Camera With Sound Recording Capabilities

FIG. 1 shows a front perspective of a camera according to the invention. The still photographic imaging portion of the camera is like many battery-operated cameras on the market. Almost any type of camera can be used. This example shows a single-lens-reflex (SLR) type camera. Preferably the camera includes an automatic-exposure control and a motor-film advance. Also preferably this camera winds the film out of the film canister upon loading, then recalls exposed photos back into the canister one at a time (Film handling other than this prevents recording of audio onto the last or innermost quadrant of the roll). The film used can be color, or black-and-white. The camera can be programmed for use with almost all speeds of film. No special film is required.

A prior-art photographic processor 99 is mounted within the camera. This processor operates in conjunction with such things as the size of the aperture, shutter speed, and flash to control photographic imaging and film handling. The operation of processor 99 is monitored and controlled by a central processing unit 106. Central processing unit 106 processes all incoming information and controls all camera and recording functions. Contained within unit 106 are an analog-to-digital audio converter, solid-state audio storage circuitry, a digital-to-analog audio converter tied to an amplifier for preview functions, a switch for changing transducer 104 (explained in the next paragraph) from input to output, a control-logic circuit for photographic and film handling functions, and circuitry for controlling the functions for an optical writing block 109 (shown in FIG. 2). In addition to being connected to a power source, such as internal batteries, central processing unit 106 is electrically connected to each of the components described in the next paragraph.

Affixed to the surface of the camera is a transducer 104. In a Record mode (described infra) transducer 104 functions as a microphone, transforming sound waves into electrical energy. In a Preview mode (also described infra) transducer 104 functions as a speaker, transforming electrical energy into sound waves.

Located on the front of the camera for convenience is a control panel 100. Panel 100 includes a mode switch 100a, a manual advance button 100b, a select button 100c, a display screen 100d, and two multifunction buttons 100e and 100f. Relative to the mode and function of the camera, multifunction buttons 100e and 100f allow the operator to work the Preview, Narrate, Trim, Slide, Balance, and Hash settings Mounted atop the camera is a shutter button 102, common to most cameras. Instead of being connected to photographic processor 99, button 102 connects to central processing unit 106 and is used to initiate sound as well as visual recording.

Figure 2:
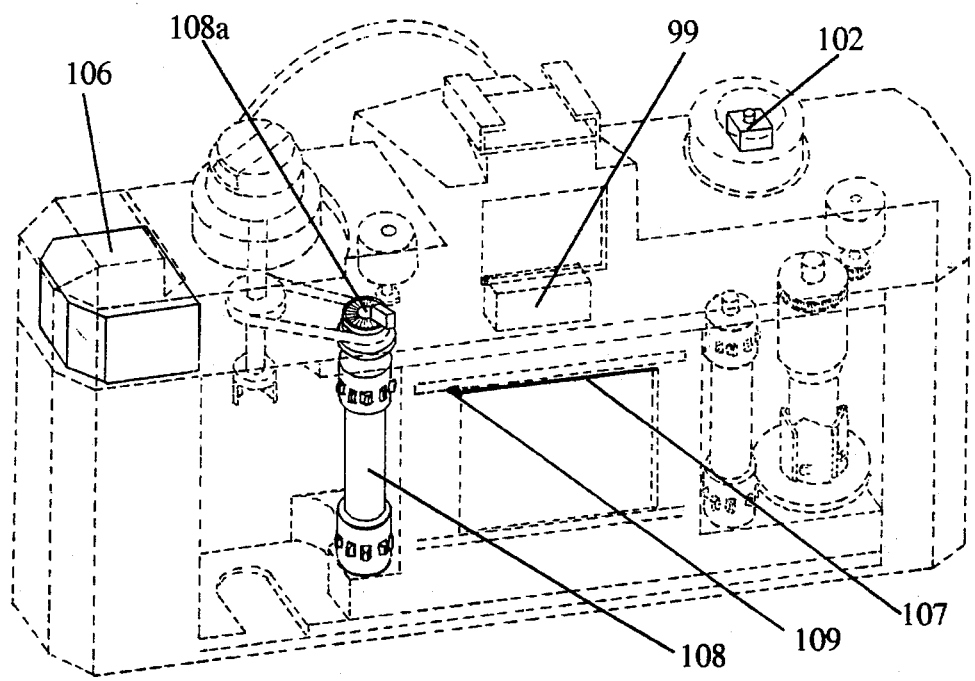
FIG. 2 shows a rear view of the same recording device in accordance with the invention.

FIG. 2 — Perspective Rear View of Camera With Sound Recording Capabilities

As shown in FIG. 2, mounted inside the camera in the top portion of the exposure area is an exposure barrier 107. Barrier 107 inhibits the exposure of a small portion of film to visual images, thereby securing an unexposed area of film for audio recording. Inside the camera, atop a film guide 108, is a film advance sensor or tachometer 108a. By engaging the film (not shown) by way of prior-art sprocket holes 130 (FIG. 4), guide 108 and tachometer 108a determine the speed of advancing film. Also inside the camera, in the film path, but isolated from the light introduced from the shutter, is an optical writing block 109. Optical writing block 109 contains the means by which all audio related information is imprinted onto the film.

Figure 3:
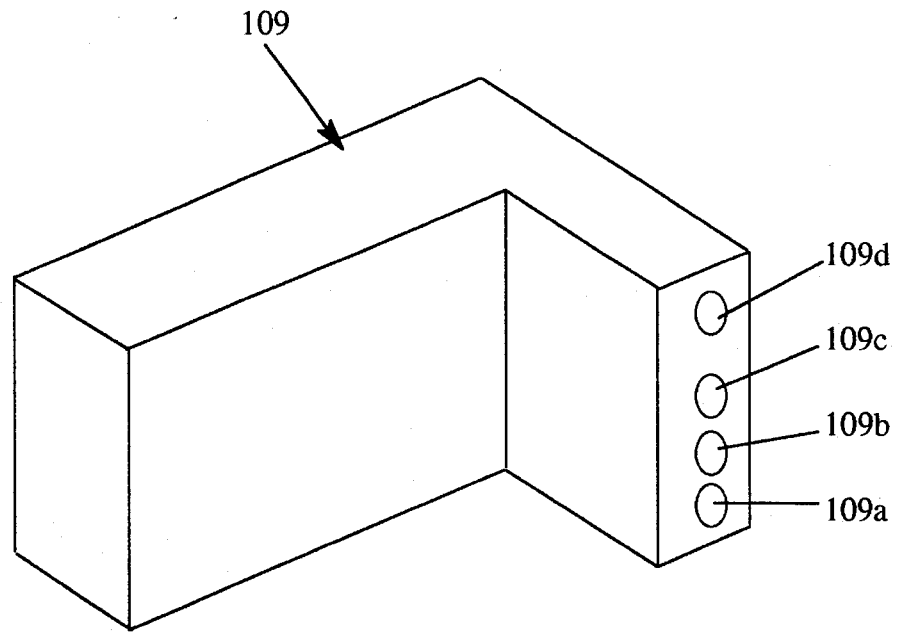
FIG. 3 shows a magnified view of an optical writing block in accordance with the invention. This block is contained inside the camera.

FIG. 3 — Magnified View of Optical Writing Block 109

As shown in FIG. 3, two optical emitters, 109a and 109b, are contained within optical writing block 109. These two emitters imprint onto the film, two light signals representing two tracks of audio. A clock or time base optical emitter 109c imprints a light signal representing timing pulses onto film, and a guide track optical emitter 109d imprints a light signal representing a solid line onto film. This solid line is used for alignment during reading. As the film passes, each of the emitters listed above emits light pulses which react with the emulsion of the film and leave patterns representing the respective ON and OFF states. The ON and OFF states of optical emitters 109a and 109b represent digital binary bits. The number of optical emitters can change, depending upon the amount of information to be stored and read.

Figure 4:
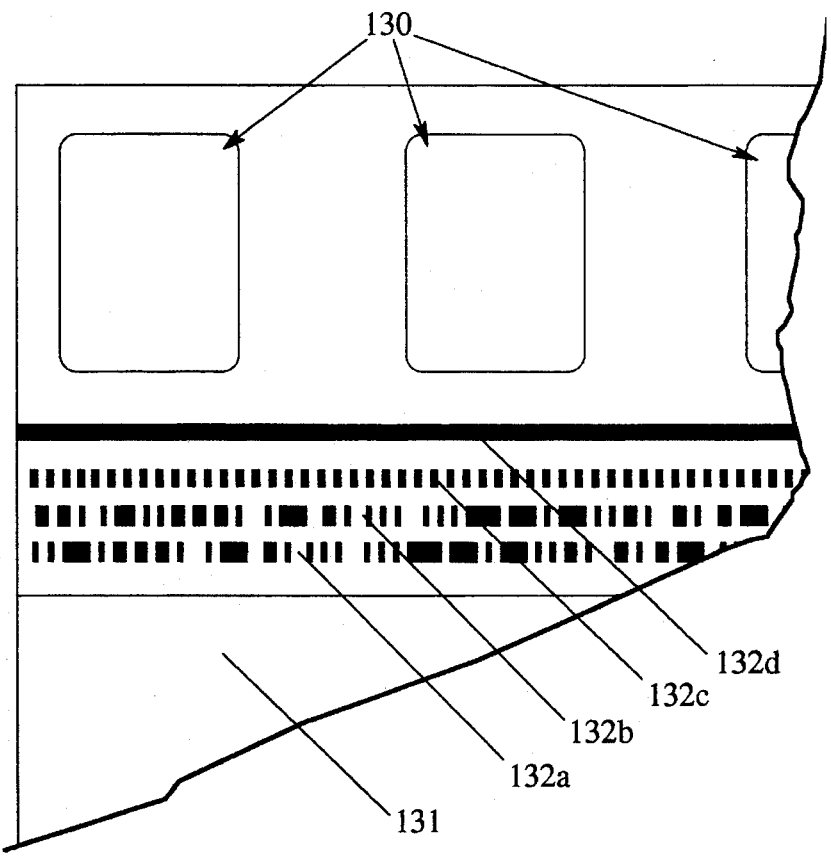
FIG. 4 shows a portion of a 35 mm negative with recorded audio information tracks in accordance with the invention. Note, since this is a negative, the position of elements are inverted with photographic area at bottom, and audio information at the top.

FIG. 4 — Portion of 35 mm Film Containing Audio Information

FIG. 4 shows audio information recorded in accordance with the invention. The prior-art photographic area is shown at 131. A guide track 132d consists of a solid line created by a continuous light signal emitted by emitter 109d (FIG. 3). Clock track 132c is created by a series of light pulse emissions from emitter 109c (FIG. 3); this represents the time base of the recording. Tracks 132a and 132b are the audio information of the recording. The analog audio signal is converted into a binary digital code (ONEs and ZEROs), this code is recorded onto film with a series of light pulse emissions (ONs and OFFs representing the ONEs and ZEROs).

The number of audio information tracks is directly proportional to the amount and quality of the information stored. Although multichannel audio is possible if more than one audio track is used, here they are preferably combined to create one monaural recording. This combining is most easily accomplished by sequencing them. The audio is stored in solid-state circuitry as one continuous stream of digital information. The information is electronically divided into two portions, those being the first half (A) and second half (B) of a recording. During film advance, these portions (A and B) are simultaneously but separately converted to light pulse emissions by way of emitters 109a and 109b (FIG. 3), respectively, and recorded onto the film.

Recording of Sound

To record audio information for storage on a photograph the following process occurs. Sound enters the system through transducer 104 which transforms audible sound into electrical energy. This energy enters central processor 106, is converted to a digital binary code (ONEs and ZEROs), and is stored in solid-state circuitry in real-time. The solid-state circuitry stores a predetermined duration of sound (ten seconds in this example). This stored audio is electronically divided into two portions (A and B) for recording on two separate tracks (132a and 132b). Portion A is comprised of the first five seconds of audio, and portion B is comprised of the second five seconds. After the photographic image is captured in accordance with prior-art processes, the film is advanced past optical writing block 109. The rate of the advancing film is determined by tachometer 108a. Stored digital audio portions A and B are then played simultaneously at the rate determined by the advancing film. The simultaneous digital binary codes (ONEs and ZEROs) of audio portions A and B are directly translated to streams of ONs and OFFs which are routed respectively to optical emitters 109a and 109b of optical writing block 109.

Exposure barrier 107 prevents a very small strip of film from being exposed to the photographic image. This strip of film is exposed to the ON and OFF activity of emitters 109a and 109b. This emitter exposure creates an exact pattern of the digital audio onto the film itself.

To facilitate reconstruction of this digital code back into audible sound, two additional tracks are also created during this process. Track 132c is the time base reference track which consists of a series of pulses indicative of the rate at which the audio was recorded. These pulses are translated into emitter activity as previously described utilizing optical emitter 109c. Track 132d is a solid guide track which facilitates the alignment of all audio information during playback. Track 132d is created by switching ON optical emitter 109 during film advance.

Figure 5:
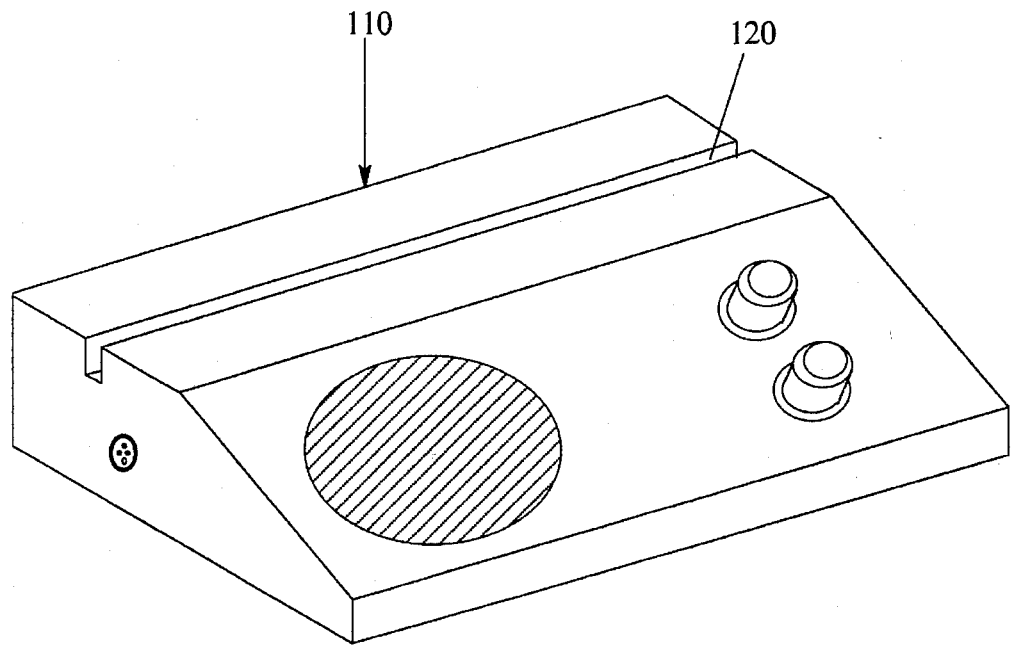
FIG. 5 shows a front view of a playback or reader device in accordance with the invention.

FIG. 5 — Perspective View of Device for Reading Audio Information From Photographs FIG. 5 illustrates a reader device 110 which is used to read and play audio information from the photographs. A photo slot 120 is located in the top surface of reader device 110. When the user slides the audio information portion of a photograph through slot 120, the audio information of this photograph becomes accessible to optical sensors (FIG. 6).

Figure 6:
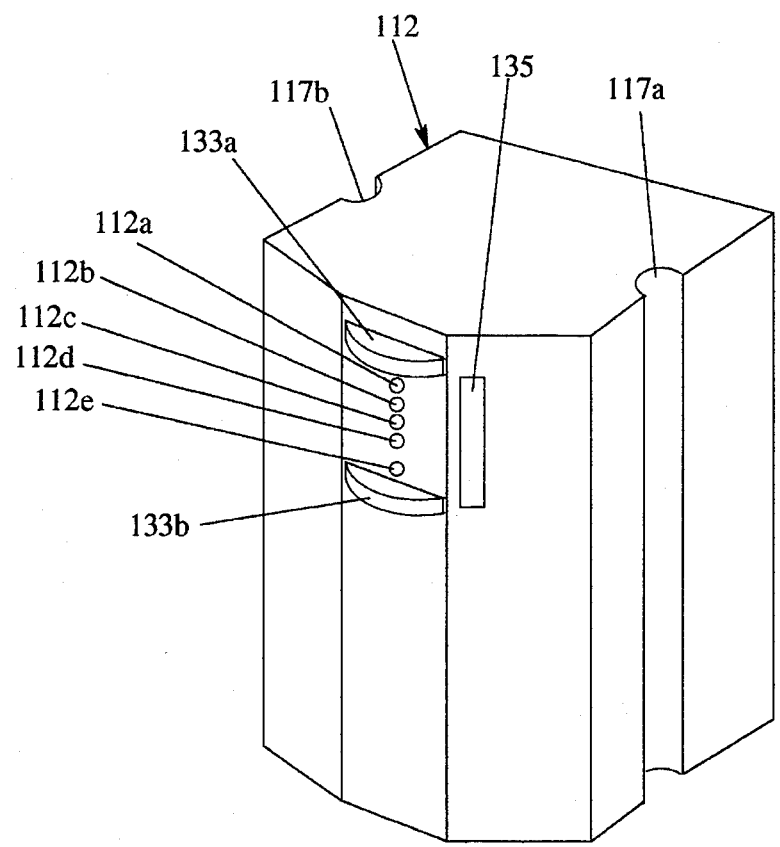
FIG. 6 shows a magnified view of an optical sensor transport contained inside the reader device of FIG. 5 in accordance with the invention.

FIG. 6 — Magnified View of Optical Sensor Transport 112

FIG. 6 shows a magnified front view of an optical sensor transport 112 which is contained within reader 110. Two tower bushings, 117a and 117b, are located at the sides of optical sensor transport 112. Two optical audio sensors 112a and 112b, an optical clock sensor 112c, and optical guide sensors 112d and 112e are located on the photographic face of optical sensor transport 112. Two transport runners, 133a and 133b, are located above and below the optical sensors. These runners allow a predetermined spacing between sensors and photograph, and prevent the information surface from being scratched by the sensors. A light source 135 is located on the beveled surface of optical sensor transport. Sensors 112a through 112e are able to read the optical tracks with which they are aligned by sensing the light from source 135 that is reflected by the more reflective or lighter areas of the tracks. This location of light source 135 prevents line-of-sight transmission of light to sensors, and allows only light reflected off photograph to be sensed.

Figure 7:
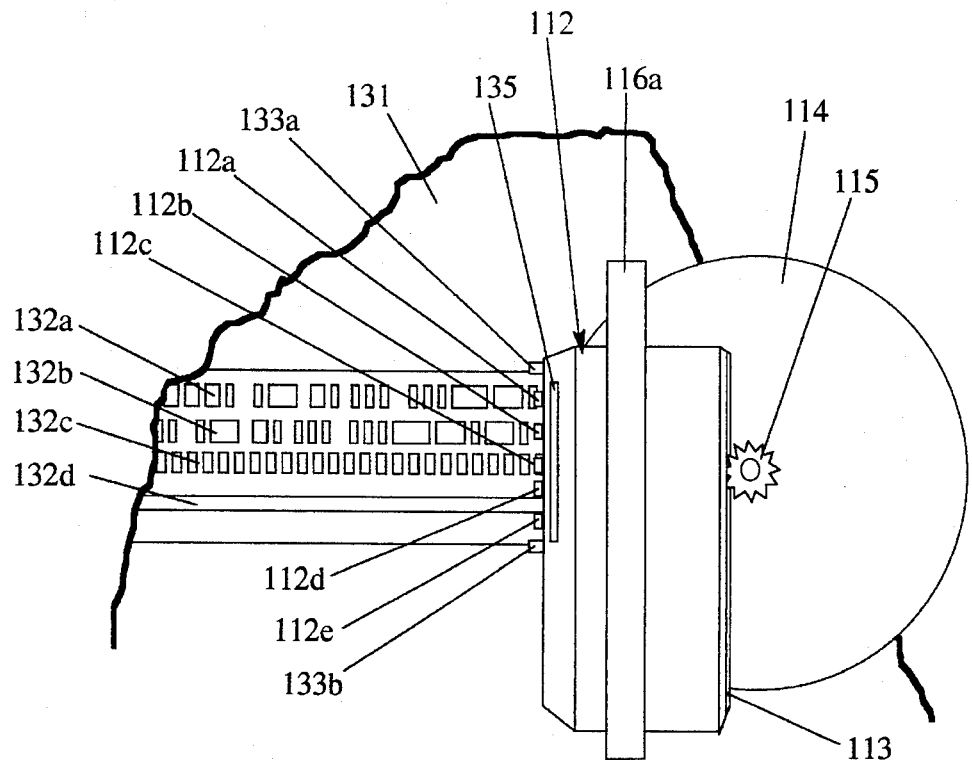
FIG. 7 shows a magnified view of audio information tracks contained on a photograph in accordance with the invention. These tracks, created by the camera device, are aligned with the optical sensor transport.

FIG. 7 — Optical Sensor Transport 112 Aligned With Audio Tracks of Photograph FIG. 7 shows optical sensor transport 112 aligned with the audio portion of a photograph. Since the photograph will be passed through the reader device at varying speeds, track 132c is read by optical sensor 112c to supply a precise time base or clock reference for the audio information. The audio information is read from audio tracks 132a and 132b simultaneously by optical sensors 112a and 112b and stored in solid-state circuitry. During playback, audio information from track 132a is played first, followed by information from track 132b, and so on.

Figure 8:
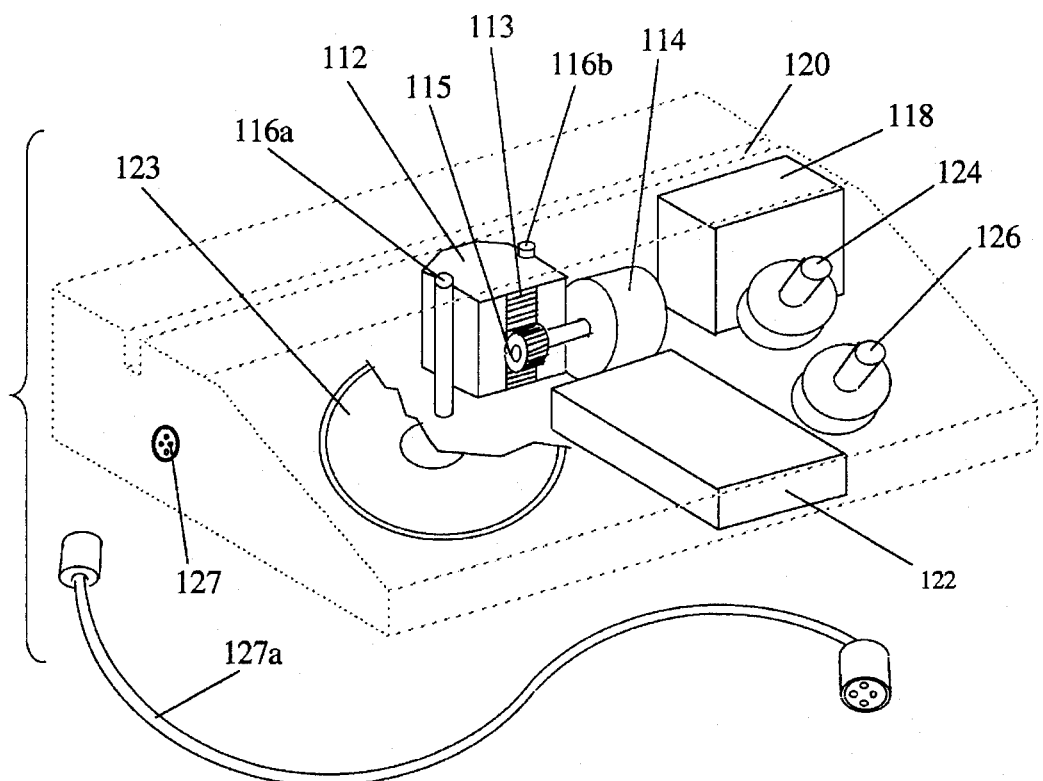
FIG. 8 shows a front view of the same reader device shown in FIG. 5 in accordance with the invention. This view indicates internal part locations.

FIG. 8 — Perspective View of Reading Device 110

FIG. 8 indicates a front transparent view of reader 110. To allow vertical adjustments, and assure all other necessary alignments, optical sensor transport 112 is positioned with two tower bushings 117a and 117b fitted between two transport towers 116a and 116b, respectively. Attached to the shaft of transport motor 114 is a pinion 115. Pinion 115 meshes with a rack 113 along the rear surface of optical transport 112. Shown near reading device 110 is an interface cable 127a.

For the purpose of installing photographs into a photographic receptacle 139 (FIG. 9), reading device 110 will occasionally be interconnected by way of interface cable 127a to this receptacle.

Figure 9:
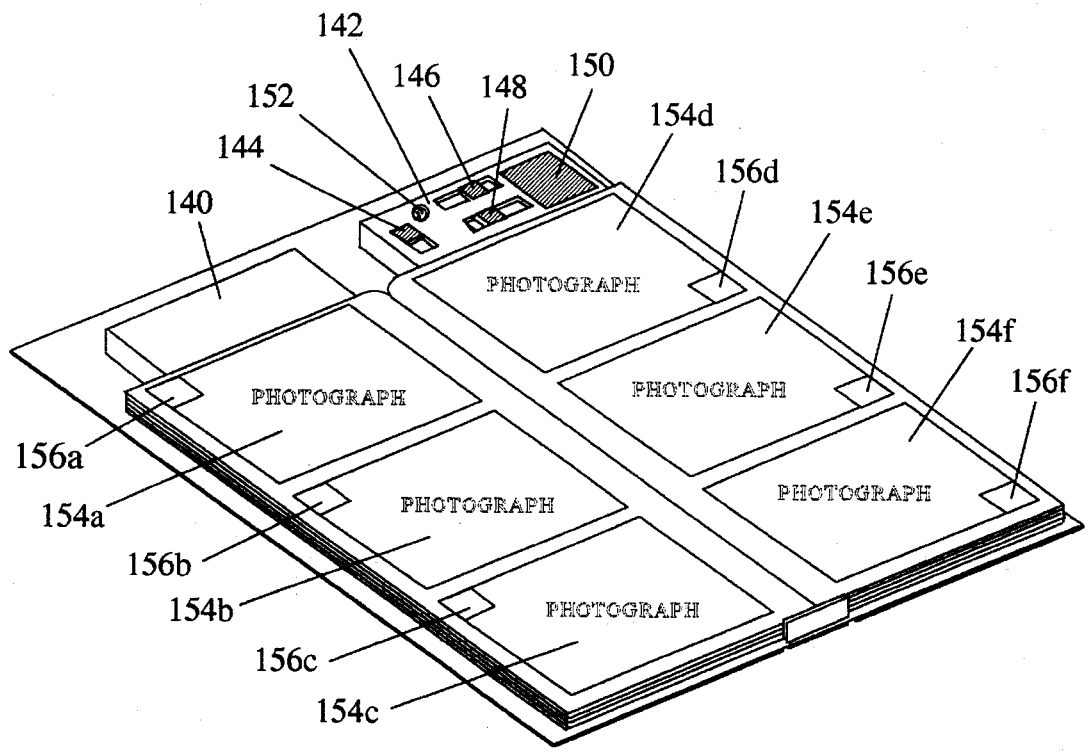
FIG. 9 shows a front view of a photo receptacle device in accordance with the invention.

FIG. 9 — Perspective View of Storage Receptacle for Photographs Which Contain Audio FIG. 9 shows a front view of a photographic receptacle 139 which stores and offers the user access to a plurality of photographs and associated audio recordings. Near the top of receptacle 139 is a solid-state audio storage unit 140. Unit 140 contains enough memory to hold all the audio information for receptacle 139. Interconnected to unit 140 is a control console 142, into which is mounted a reader interface connector 152. Mounted at the surface of this console is an On/Off switch 144, an audio level or volume controller 146, and an audio fidelity or tone controller 148.

Receptacle 139 contains several photograph slots or sleeves 154a through 154f in this example. These slots may be varied in size and/or material. I presently prefer a transparent, vinyl material mounted as pages in a book style holder. The vinyl pages contain an opening toward the binding for inserting photos (not shown).

Adjacent to each photo are photo slot audio triggers 156a through 156f. Although other variations are possible, I presently prefer to use for these triggers a static electric or similar field surrounding each photo. Processor 143 (FIG. 10) will isolate and monitor the status of these fields. If a field above or adjacent to any photograph is interrupted, for example by a person touching a photograph, processor 143 (FIG. 10) will sense this interruption and trigger that specific audio address. Indicated in the corners of the photo slots are simple switches. These switches utilize the same electrical connections as the afore mentioned triggers, and are used only during the installing of photographs into the receptacle to help prevent false triggers during this installation process.

Figure 10:
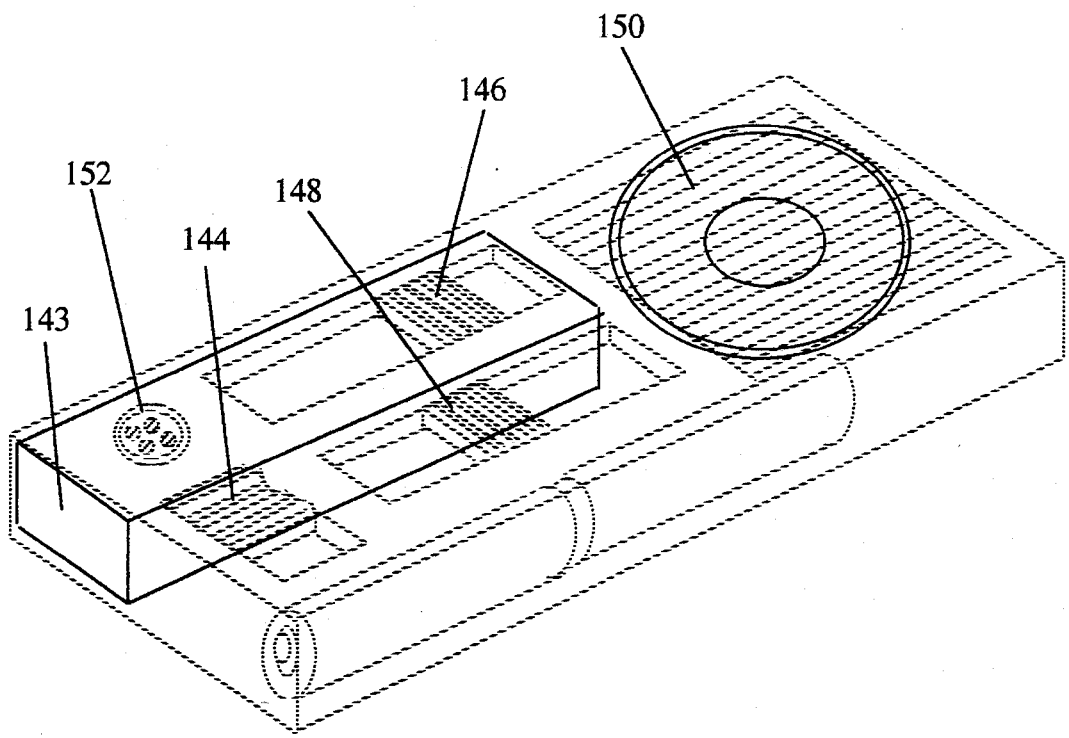
FIG. 10 shows a magnified view of a control console used in accordance with the invention, with the broken lines indicating an enclosure.

FIG. 10 — Magnified View of Control Console 142 of Photographic Receptacle 139

As indicated in FIG. 10, a processor 143 and a speaker 150 are contained within control console 142.

Figure 11:
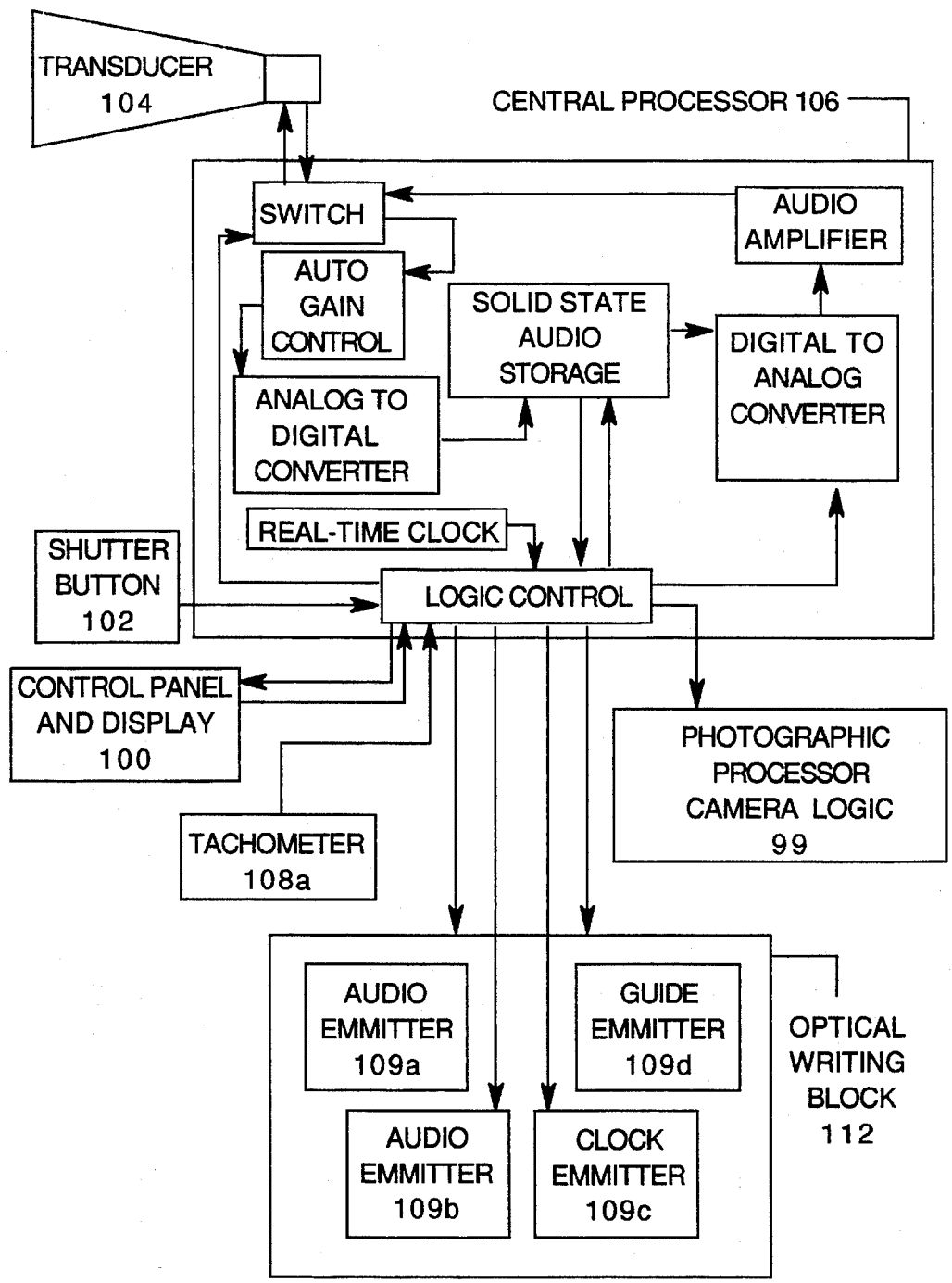
FIG. 11 illustrates the electrical flow and connections of the camera in accordance with the invention.

FIG. 11 — Electrical Flow Chart of Camera with Sound Recording Capabilities

The electrical flow of the camera is illustrated in FIG. 11. In the automatic mode, the picture taking and audio recording is initiated by depressing shutter button 102. As shown, sound is received by transducer 104 and is there converted into an electrical audio signal. This audio signal flows into central processor 106 where it is converted to a digital binary code and stored in solid-state circuitry. A predetermined duration of audio recording takes place, ten seconds for this example. After this ten seconds, photographic processor 99 receives a signal from central processor 106 and electronically actnines the photographic shutter. At this point a visual image is recorded on the film and the natural audio recording is completed. Photographic processor 99 automatically initiates the advance back into the film canister of the exposed film quadrant. The rate of this film advance is determined by tachometer 108a which conveys this information to central processor 106. Utilizing the film advance rate as a non real-time clock, central processor 106 internally plays the digital audio. The binary code of ONEs and ZEROs causes audio emitters 109a and 109b to be switched ON and OFF. The pulses of the non real-time clock cause clock emitter 109c to be switched ON and OFF. Guide emitter 109d is switched ON during any film advance.

In the manual mode, the process occurs as in the automatic mode, with the exception that photographic processor 99 does not initiate the advance back into the film canister of the exposed film quadrant until indicated to do so by the operator. The operator makes this indication at control console 100 by depressing advance button 100b (FIG. 1). The manual mode allows the operator to preview, edit, and manipulate the recorded audio, and/or add a narration or additional audio prior to the recording onto film. During the preview function, the audio from solid-state storage is converted from digital to analog form. This audio is then amplified, and routed through transducer 104 to be heard. Power is supplied by internal batteries (not shown).

Figure 12:
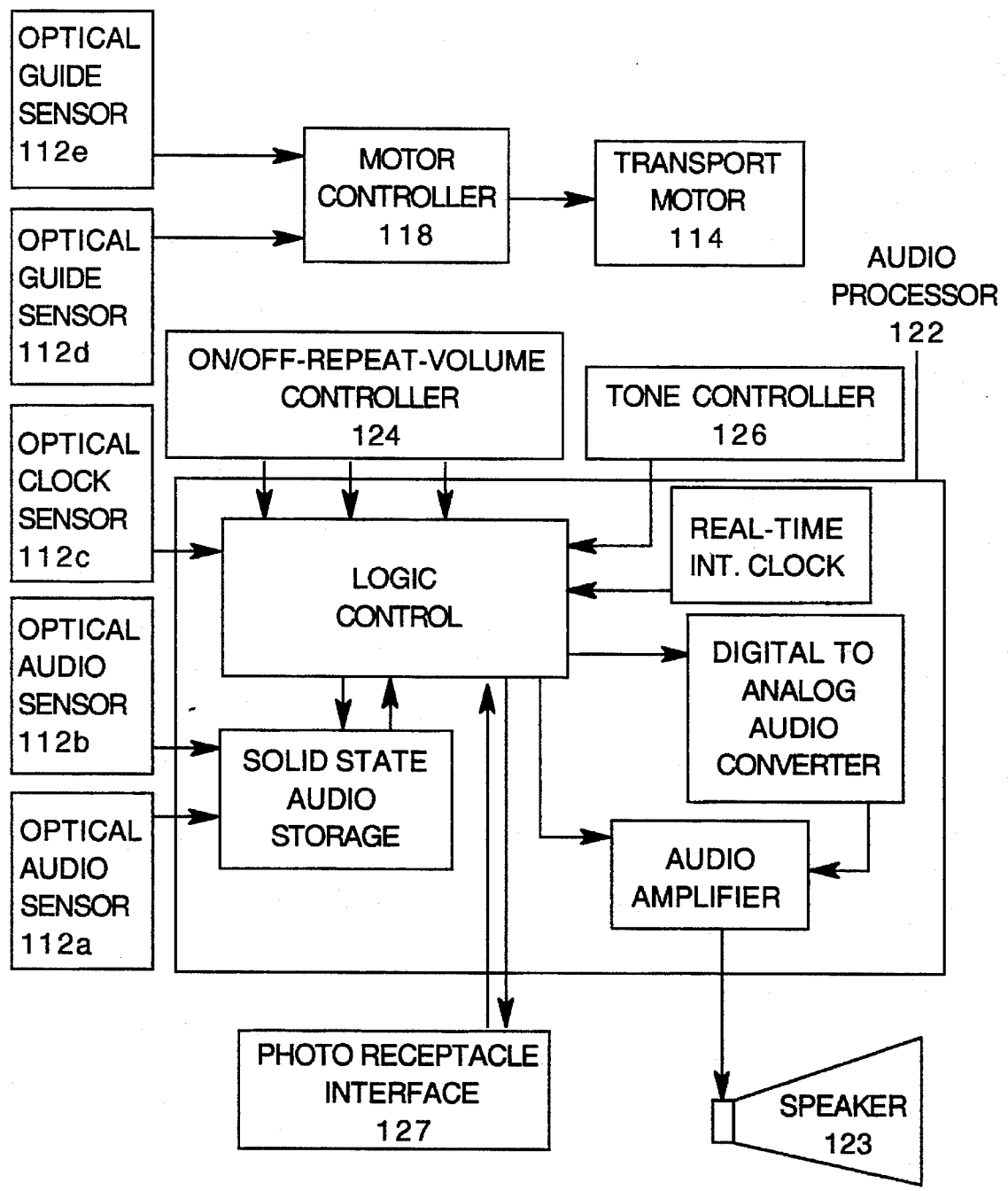
FIG. 12 illustrates the electrical flow and connections of a reader device shown in FIG. 5 in accordance with the invention.

FIG. 12 — Electrical Flow Chart of Reading Device 110

As indicated in FIG. 12, two optical guide sensors 112d and 112e are electrically connected to a motor controller 118, which in turn is connected to a transport motor 114. Two optical audio sensors 112a and 112b and a clock sensor 112c are connected to an audio processor 122. A speaker 123 is connected to audio processor 122, as is an audio fidelity or tone controller 126, and a multifunction switch 124 which functions as (a) an On/Off switch, (b) an audio level or volume controller, and (c) a repeat switch. Audio processor 122 is also connected to a photo receptacle interface 127. Power is supplied by internal batteries (not shown) or an external source.

Figure 13:
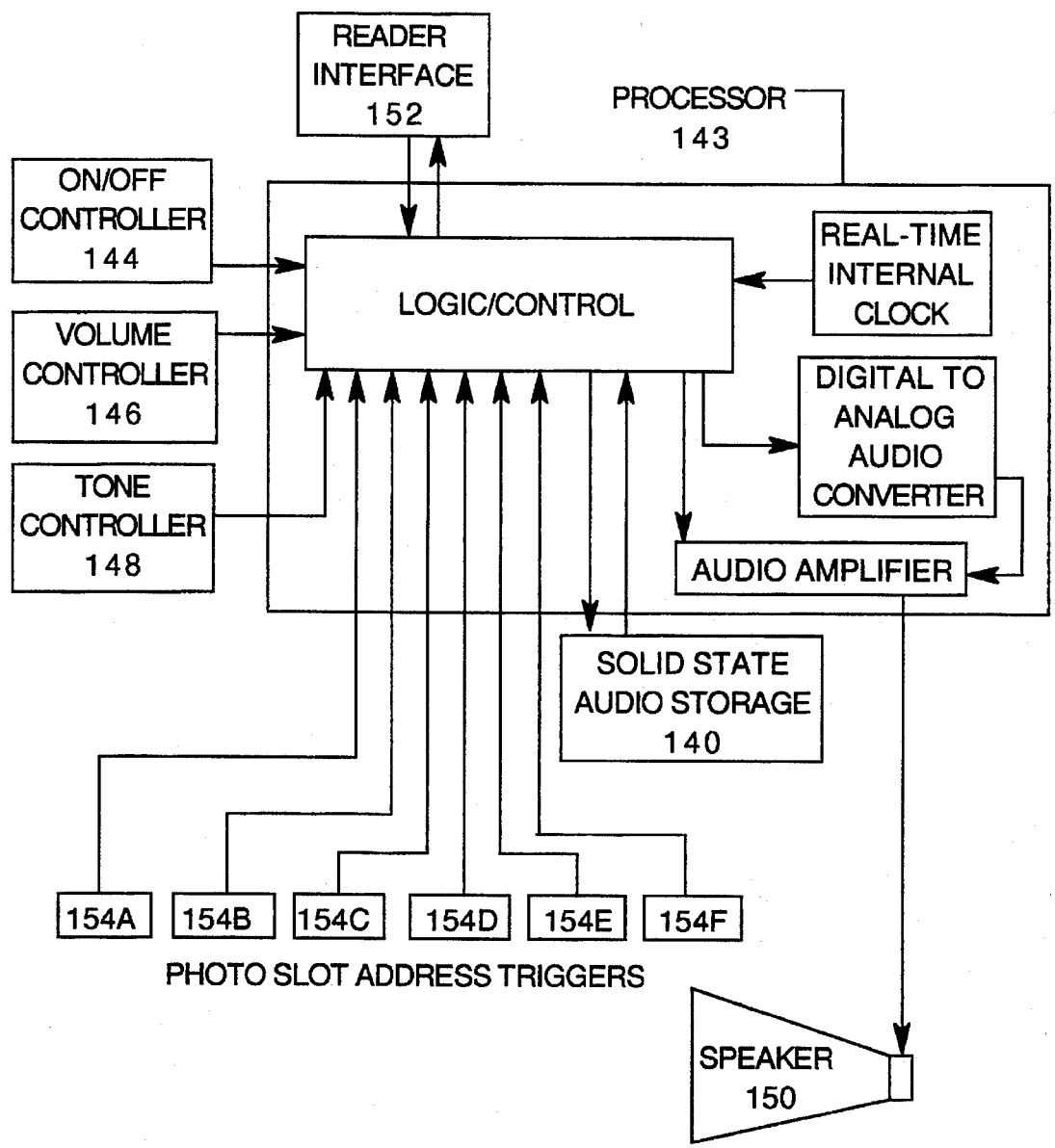
FIG. 13 illustrates the electrical flow and connections of a photographic receptacle in accordance with the invention.

FIG. 13 — Electrical Flow Chart of Photographic Receptacle 139

As indicated in FIG. 13, audio information is introduced into the receptacle by way of reader interface 152. This audio is processed, given a unique address, and stored in audio storage unit 140 as a digital binary code. Audio addresses are identified and selected by electrical signals from photo slot address triggers 154a through 154f. The selected digital audio is converted to analog form and amplified within processor 143. The amplified audio signal is made audible by way of speaker 150. The functions are controlled with On/Off controller 144, volume controller 146, and tone controller 148. Power is supplied by internal batteries (not shown) or an external source.

Operational Overview

The sound system for still film photography allows the user to easily capture and record an audio segment onto the film at the time of picture taking or at any later time before another picture is taken.

The audio recording is permanently imprinted as a small portion of the photo itself. Hardly visible to the human eye, it is a physical audio image that is reproduced onto every print. For example the system may be used to produce multiple quantities of a photo Christmas card, which includes the audio of the family singing "Jingle Bells"; the cards will have first generation audio quality, using off-the-shelf film, and standard processing (photo finishing).

The audio is played when the operator slides the portion of the photographic print which contains audio information through a reading device.

This system also provides a photographic storage receptacle similar to a photo album. This receptacle allows random access to the photographs and associated audio contained within.

FIG. 11 — Electrical Flow Chart of Camera with Sound Recording Capabilities

CAMERA, Automatic mode

In the automatic mode, the camera operates as follows:

As illustrated in FIG. 11, depressing shutter button 102 sends an actuation signal to central processor 106 which initiates audio recording. Sound from a voice or other source is received by transducer 104 which converts it to an audio signal. The audio signal flows into central processor 106 where the level is automatically adjusted, then the signal is convened from analog to digital form. The audio is then recorded in real-time into a solid-state memory. For this example, the duration of audio recording is ten seconds.

Then central processor 106 sends an actuation command to photographic processor 99 to operate the shutter mechanism and collect the photographic image.

Once the photograph has been taken and the audio has been recorded, central processor 106 signals photographic processor 99 to advance the exposed film and prepare for the next photograph. The advancing film turns film guide 108. Tachometer 108a senses the movement and rate of the advancing film. As the film passes, tachometer 108a generates a series of electrical pulses corresponding to the film advance rate, and sends these pulses to central processor 106.

The rate of these pulses is measured by central processor 106 which generates internal clock pulses corresponding to the film advance rate, then plays the recorded audio at that rate. The playing audio is not made audible; instead the binary code of this audio serves as the driver for optical audio emitters 109a and 109b which are turned ON and OFF corresponding to the ONEs and ZEROs of the binary code. This ON and OFF activity of the emitters exposes a designated portion of film as the film passes. This exposure creates audio tracks 132a and 132b as shown in FIG. 4.

FIG. 4 — Portion of 35 mm Film Containing Audio Information

The internal clock pulses generated by central processor 106 during the film advance serve as the driver for optical clock emitter 109c. Optical clock emitter 109c is turned ON and OFF in response to the clock pulses from processor 106. This ON and OFF activity of emitter 109c exposes a designated portion of film, which in turn creates a clock track 132d on the film.

The movement of film past optical emitting block 109 switches ON optical guide emitter 109d. The light emitted from 109d exposes a designated portion of film which creates a solid line or guide track on the film as it passes.

This process is repeated for each photograph taken.

The color of guide track 132d can be made different from the other information tracks to make it more readily distinguishable to the optical sensors, which are described under "READING DEVICE 110" below. For example, guide track 132d can be red in color, and the rest of the information tracks can be white.

FIG. 1 — Perspective Front View of Camera With Sound Recording Capabilities

Shown in FIG. 1, camera control panel 100 can be used to select several functional settings, along with editing and narration capability. It determines the flash point or, at what point in the duration of audio recording the photograph will be taken. It allows the operator to trim and slide the natural audio, activate the preview and narrative functions, and adjusts the mix levels or balance of audio elements as they are written onto the photo. Control panel 100 allows the user selection between Automatic, Manual, and Action modes. These three modes will now be explained.

MODES:

Automatic: The Automatic, mode is for operators who want to take pot luck in gathering the audio, or are not particular as to exactly what audio information is recorded. In this mode the audio is first recorded, then the picture is taken as preset at control console 100. The film automatically advances to the next shot and audio is written as film passes optical block 109.

Example: While photographing a birthday party, the operator places the camera on a tripod and frames a shot with the celebrant seated at the lighted cake and the crowd surrounding him. The crowd begins to sing "Happy Birthday". Knowing that the average length of this song is approximately 15 seconds, the operator waits 6 seconds, depresses the shutter button and walks around to be included in the photograph. Depressing the shutter button initiates audio recording. Ten seconds pass, the shutter is actuated and the picture is snapped just as our celebrant is blowing out the candles. The shutter actuation signals the end of audio recording. The film is then automatically advanced for the next shot. When the picture is processed, we have a photograph containing the visual image of our celebrant blowing out the candles, and an audio recording of: ". . . to you, Happy Birthday dear Billy . . . Happy Birthday to you!" [sound of candles being blown out][crowd cheering] "Yeah" [shutter sound].

Manual: The Manual mode is for the operator who enjoys or desires editorial control over the content of the audio recording. In this mode audio is first recorded then the picture is taken as preset at control console 100. The film is not advanced or audio written until advance button 100b has been pressed. This allows for Preview, Editing, and Narration, functions to be actuated as desired prior to advancing.

Example: The scene is set, and the picture is taken as described above. After the picture has been snapped, the operator returns to the camera and depresses multifunction button 100f which actuates the "Preview" function in this mode. Upon depressing button 100f, the recorded audio is audibly played.

This audio is depicted below. The broken line indicates a ten second time line which equals the recording duration.

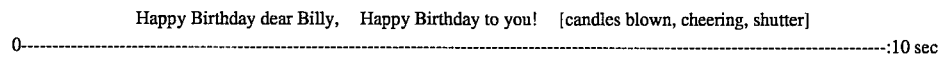

The words above the line are positioned relative to their occurrence during the ten second recording duration.

Original audio:

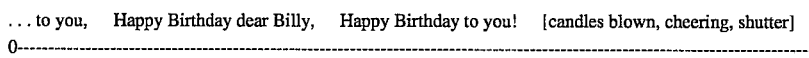

The operator chooses to modify this audio with the following procedure.

Figure 14A:
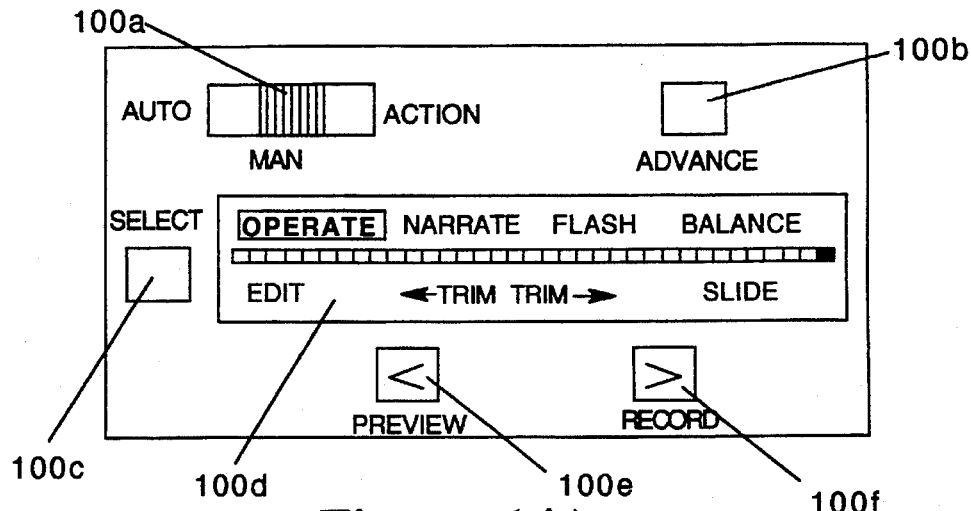

FIG. 14A — Control Console 100 in OPERATE Mode

FIG. 14A shows control console 100 in a normal Manual operating configuration as indicated by the center position of mode switch 100a, and the word: OPERATE highlighted in display screen 100d. This mode is the only mode in which a picture can be taken, therefor it is the starting point for audio manipulation. The solid black box at the far right of the row of empty boxes in the middle of display screen 100d indicate the shutter activation is preset at the end of the ten second audio recording duration.

Figure 14B:
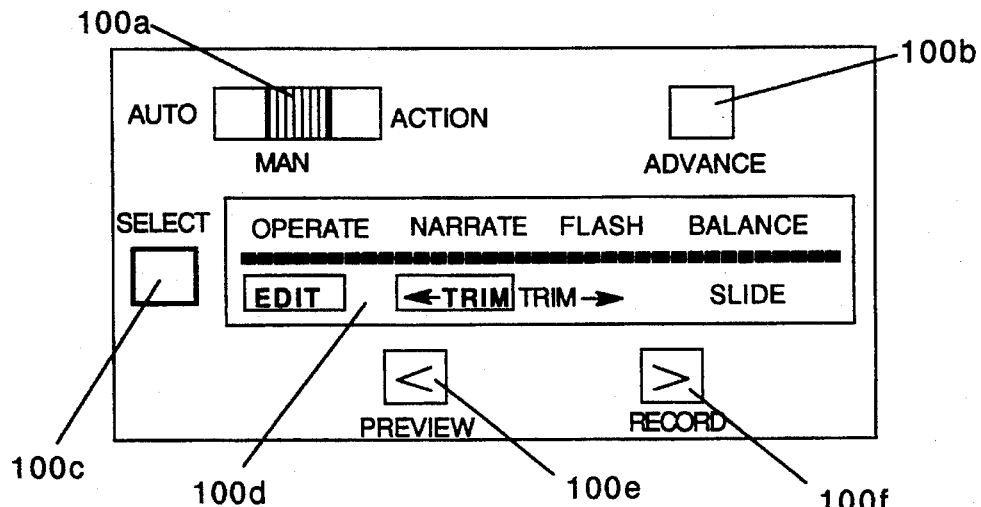

FIG. 14B — Control Console 100 in EDIT Mode with Trim Beginning Function Active

As shown in FIG. 14B, when select button 100c is depressed and held for more than one second, the camera exits the OPERATE mode, and enters the EMit mode as indicated by the word: EDIT highlighted in display screen 100d. The row of boxes in the center of display screen 100d is now a solid row of black filled boxes, indicating a full ten seconds of natural audio has been recorded. Also highlighted in display screen 100d is ←TRIM, this indicates the Trim Beginning function is active. Momentarily depressing select button 100c will individually cycle through OPERATE, NARRATE, FLASH, BALANCE and EDIT modes with each depression (not shown).

Each time any button is released while in the Edit mode, the audio is audibly played back, giving the operator an up-to-date example of each step of the audio manipulation.

Figure 14C:
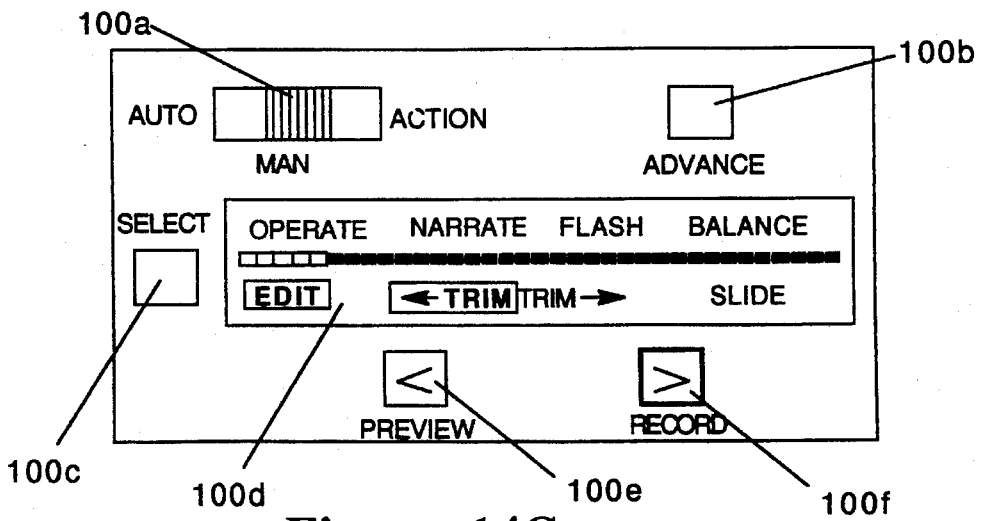

FIG. 14C — Control Console 100 While Trimming Beginning

As shown in FIG. 14C, depressing multifunction button 100f will empty the row of solid black boxes, from the left. The empty boxes are a visual representation of the audio that is trimmed from the beginning of the audio recording. The trimming of audio is accomplished at the rate is was recorded. For example, depressing button 100f for one seconds will trim one second of audio, depressing the same button for a fraction of a second will trim that fraction of a second of audio, etc. Here, approximately one second of audio has been trimmed from the beginning.

Edited (trimmed) audio:

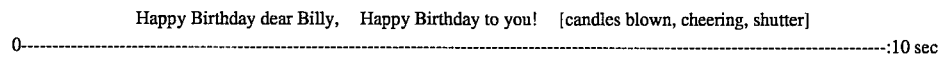

Trimmed audio from the beginning can be replaced or "untrimmed" by depressing multifunction button 100e for the desired time (not shown).

Figure 14D:
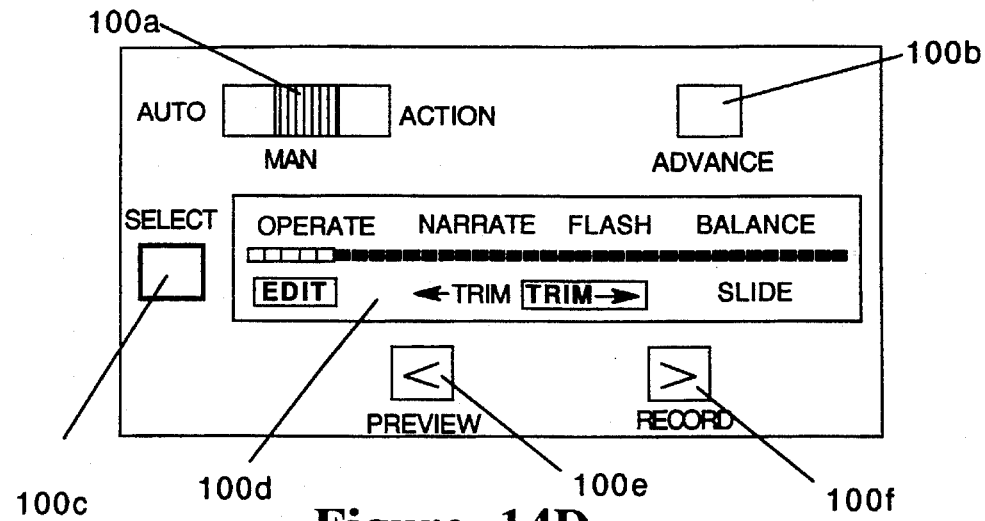

FIG. 14D — Control Console 100 in EDIT Mode with Trim End Function Active

Once the beginning audio trim is satisfactory to the user, momentarily depressing select button 100c will activate the

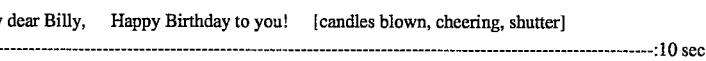

Trim End function, as indicated in FIG. 14D. This function is indicated by TRIM→ highlighted on display screen 100d.

Figure 14E:
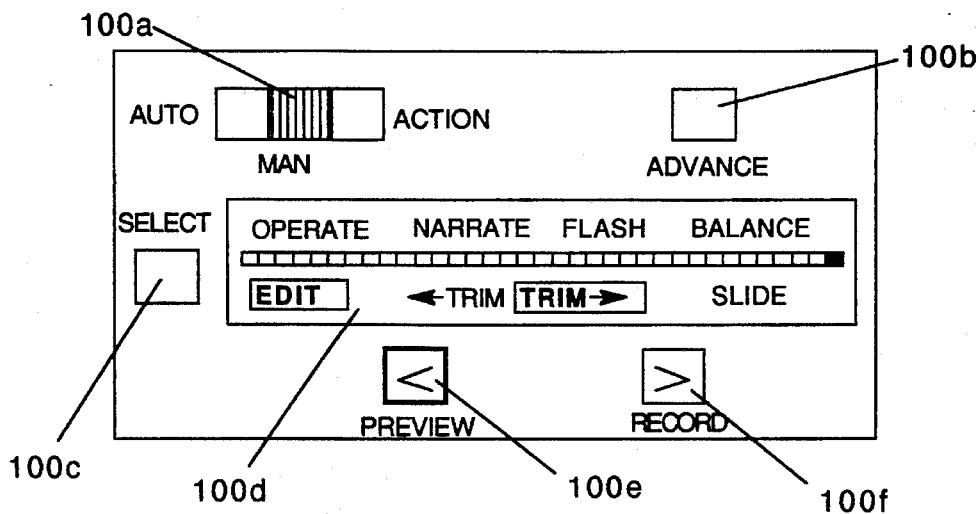

FIG. 14E — Control Console 100 While Trimming End

As shown in FIG. 14E, depressing button 100e will empty the row of solid black boxes, from the right, proportionate to the length of time and number of times it is depressed. The empty boxes are a visual representation of the audio that is being trimmed from the end of the audio recording. Here, approximately four seconds of audio have been trimmed from the end.

Further Edited Audio:

Happy Birthday dear Billy, Happy Birthday to you!
0-----------------------------------------------------------------------------------------------------:10 sec Trimmed audio from the end can be replaced or "untrimmed" by depressing multifunction button 100f for the desired time (not shown).

Figure 14F:
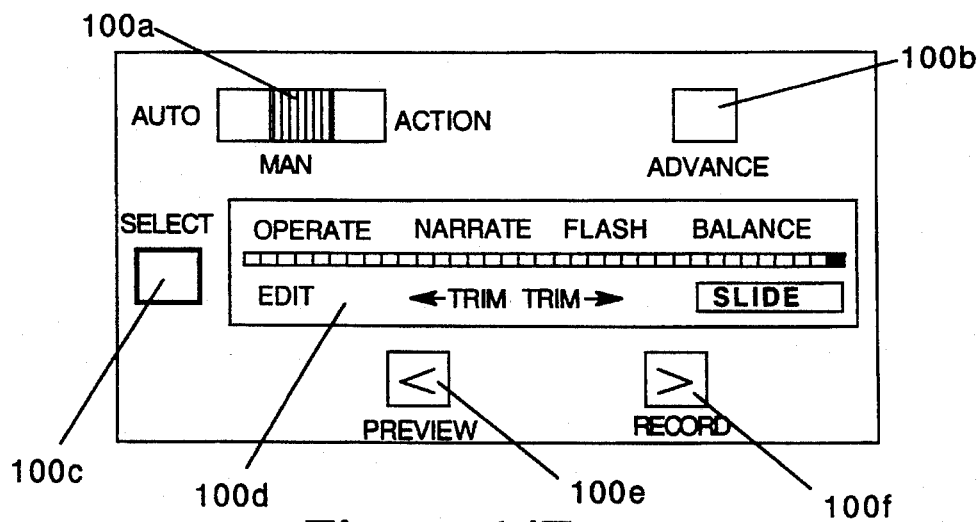

FIG. 14F — Control Console 100 in SLIDE Mode

As shown in FIG. 14F, again depressing select button 100c will activate the Slide function of the Edit mode. This function activation is indicated by SLIDE highlighted in display screen 100d.

Figure 14G:
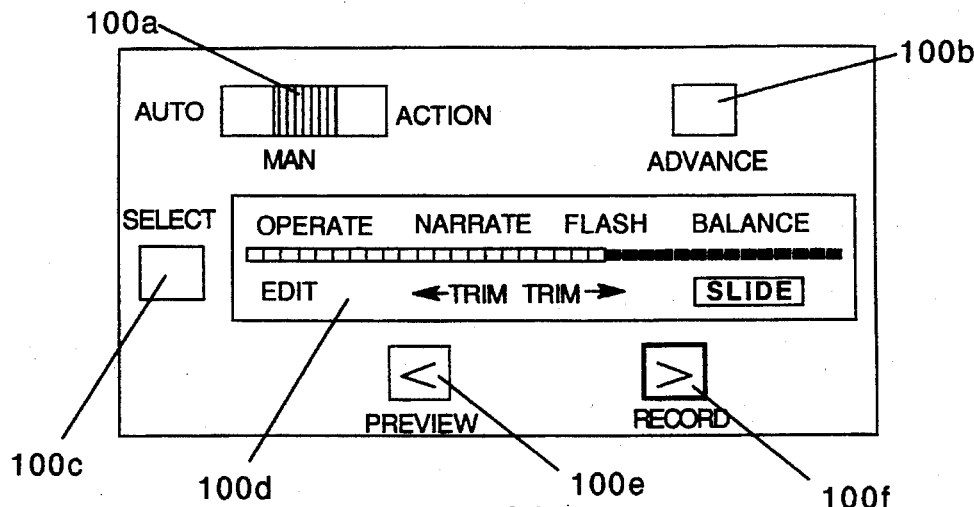

FIG. 14G — Control Console 100 During Slide Function

As shown in FIG. 14G, depressing, and holding button 100f for two seconds will slide the trimmed audio to the end, of the ten second duration. The position of the audio is indicated in display 100d by the row of filled boxes at the right side of the row.

This sliding justifies the end of the trimmed audio recording with the end if the timeline as depicted here.

Figure 14H:
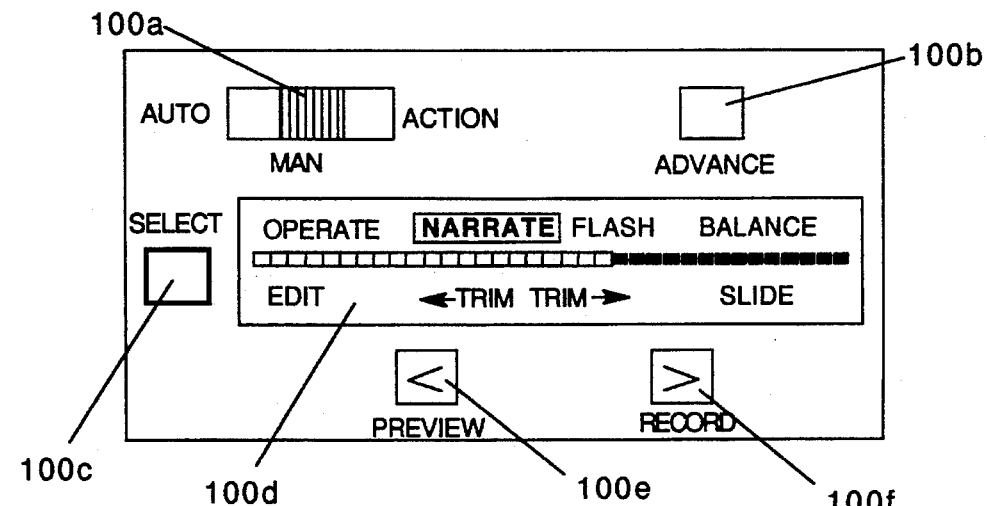

Audio reposition (slide):

Happy Birthday dear Billy, Happy Birthday to you!
0-----------------------------------------------------------------------------------------------------:10 sec FIG. 14H — Control Console 100 in NARRATE Mode As shown in FIG. 14H, when select button 100c is depressed two quick times, display screen 100d indicates the activation of the Narrate mode as indicated by the highlighted NARRATE.

Figure 14I:
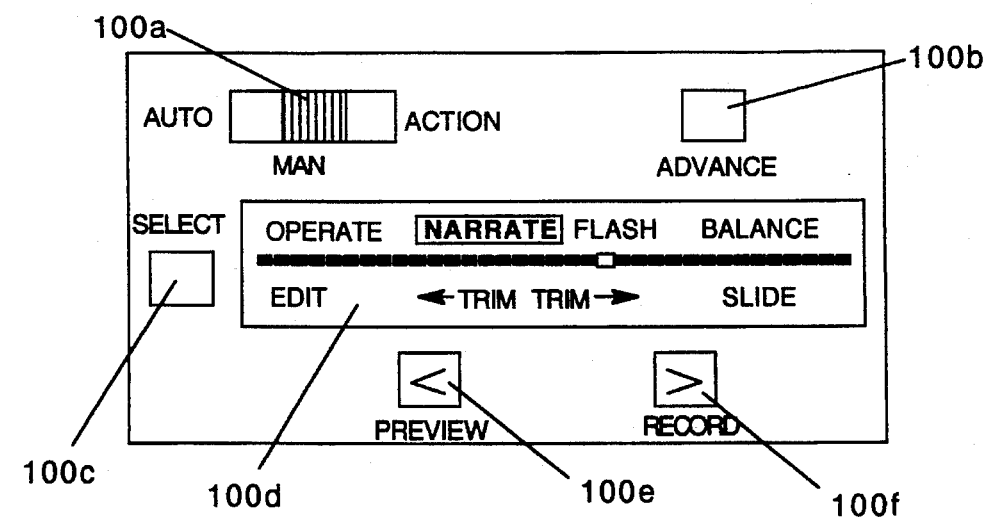

FIG. 14I — Control Console 100 While Recording Narration

As shown in FIG. 14I, depressing and holding button 100f records narrative audio. The amount of this narrative recording is indicated by the row of boxes beginning on the left, This is Billy with his friends on his 15th birthday
0-----------------------------------------------------------------------------------------------------:10 sec turning black as the recording progresses. Releasing button 100f terminates narrative recording and initiates playback of narrative and natural audio.

Depicted here is the original audio with timeline as described above, and the narrative audio along the bottom.

Additional Narration Audio:

Happy Birthday dear Billy, Happy Birthday to you!
0-----------------------------------------------------------------------------------------------------:10 sec
This is Billy with his friends on his 15th birthday In this example narrative recording was terminated prior to overlapping the natural recording, indicated by an untitled box below the unhighlighted FLASH. Narrative recording can overlap natural audio without destroying natural audio. When narrative recording overlaps natural audio, an untitled box will progress fight while recording (not shown). This white box will continue to indicate duration of narrative recording relative to the timeline.

Figure 14J:
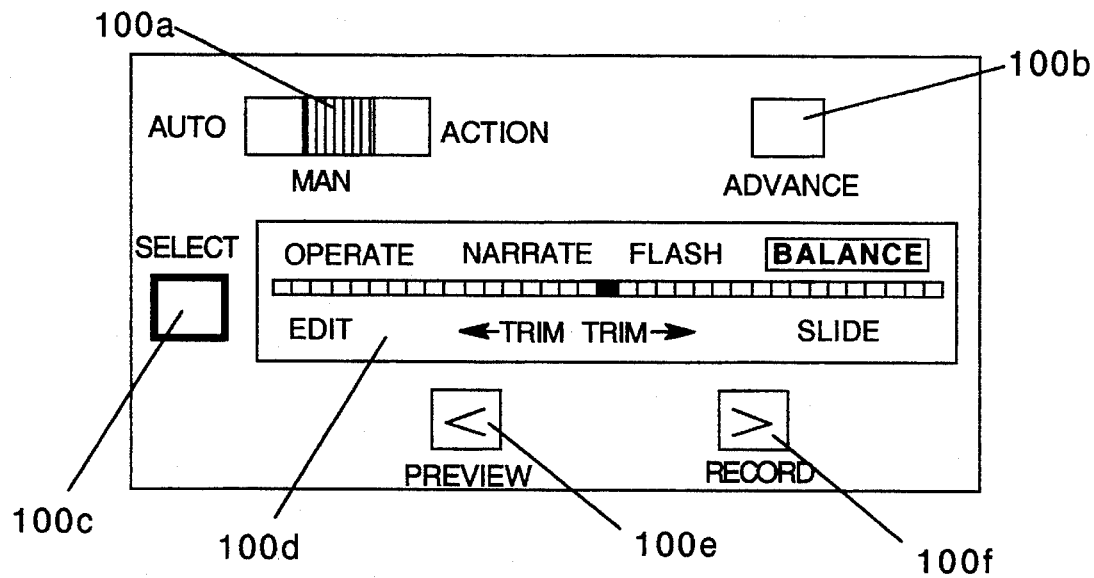

FIG. 14J — Control Console 100 in BALANCE Mode

As shown in FIG. 14J, depressing select button 100c again, will activate the Balance function as indicated by the highlighting of BALANCE. The row of blocks are untitled except for the single block in the middle. This display indicates that balance is equal between narrative and natural audio recordings. The operator can change the balance utilizing buttons 100e and 100f. Depressing 100e will proportionally increase the narration level and decrease the natural audio level. Depressing 100f will proportionally increase the natural audio level and decrease the narration level (not shown). The current balance setting is indicated by the position of the filled box in display 100d.

Figure 14K:
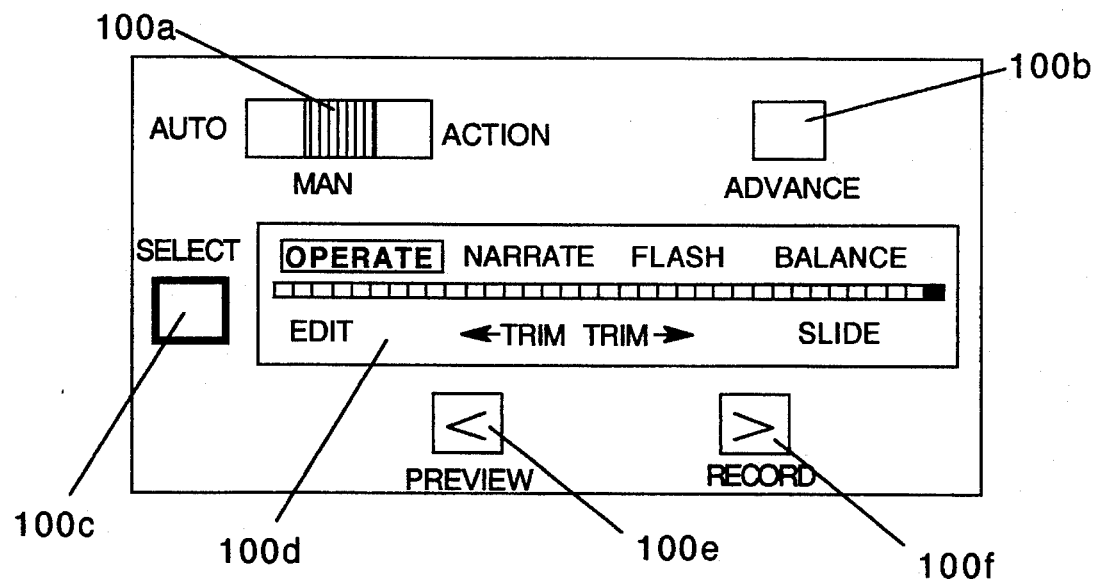

FIG. 14K — Control Console 100 Returned to OPERATE Mode

As shown in FIG. 14K, when select button 100c is depressed and held for one second, the camera is restored to the Operation mode. This restoration is indicated by OPERATE highlighted. In the Operation mode, the row of boxes indicates the position of the preset shutter activation, relative to the ten second audio recording duration. As shown, the single black box at the far fight of the row indicates a setting of 100%. This setting activates the shutter at the termination of the ten-second audio recording duration.

Final Mixed Audio:

Happy Birthday dear Billy, Happy Birthday to you!
0-----------------------------------------------------------------------------------------------------:10 sec The operator then depresses advance button 100b and the film is advanced for the next shot. When the picture is processed, we have a photograph containing the visual image of our celebrant blowing out the candles, and an audio recording of: [spoken] "This is Billy with his friends on his 15th birthday" [singing] "Happy Birthday dear Billy, Happy Birthday to you!"

Action: This mode is for more aggressive photography. The Action mode is selected by moving mode button 100*a* to the fight or ACTION position. In the Action mode, audio is constantly recorded in a solid-state loop. When the shutter button is depressed, the photo is instantly taken. The film is automatically advanced and the audio preceding the shutter is selected and written to film. This process may then be immediately repeated. If several photographs are taken in quick succession, the audio in any photograph may contain portions of audio also contained in others. This occurs because each photograph contains ten seconds of audio. If ten seconds has not elapsed between photographs, this duration will overlap.

Example: While photographing the same birthday party as above, the operator, not knowing what to expect sets the camera in the Action mode. The camera is now recording sound in a ten second solid-state loop. The operator, holding the camera by hand, frames a shot with Billy seated at the lighted cake with the crowd surrounding him. The crowd begins to sing "Happy Birthday". The operator waits for just the right moment and depresses shutter button 102 just as Billy blows out the candles. As Billy leans back in his chair to savor the moment, Susan and Ron (the two fiends on either side of Billy) produce whipped-cream pies from behind their backs and simultaneously deliver them to the respective sides of Billy's head. The operator again depresses shutter button 102. Billy, being a calm, resourceful, junior-adult now, slowly stands up, removes the pie tins from his ears (leaving large quantities of whipped-cream still clinging to his cranium) and with his friends standing there staring at him in awe, he begins to briskly shake his head and it begins to rain whipped-cream. Billy's friends squeal, laugh, and ran away. The operator depresses shutter button 102 a third time.

When the film is processed, we have a three photographs from this occasion.

The first picture contains the visual image of Billy blowing out the candles, and an audio recording of: ". . . to you, Happy Birthday dear Billy . . . Happy Birthday to you!" [sound of candles being blown out][crowd cheering] "Yeah" [shutter sound].

The second picture contains the visual image of Billy with a very surprised expression on his face, getting a pie delivered to each side of his head. The audio recording is: "Dear Billy . . . Happy Birthday to you!" [sound of candles being blown out . . . crowd cheering] "Yeah" [sclooooooch—the sound of two whipped-cream pies simultaneously impacting the sides of a 15 year-old's head . . . shutter sound].

The third picture in this sequence contains the visual image of Billy standing up, his head frozen in mid-shake with a pie tin in each of his hands. The people near him seem to be fleeing, smiling, and wiping their faces amid a shower of whipped-cream. The audio recording of this picture is: ". . . Birthday to you!" [sound of candles being blown out] [crowd cheering] "Yeah" [sclooooooch—the sound of two whipped-cream pies simultaneously impacting the sides of a 15 year-old's head], followed by a brief suspensful pause. Then we hear the sounds of laughing, squealing and the occasional "plop""plop" of small mounds of whipped-cream finding new resting places [shutter sound].

User Safeguards

While operating in the Automatic mode, the operator may encounter a situation in which the automatic sequence has been activated, but the photographic opportunity occurs prior to the preset shutter activation. In this event the operator, by again depressing shutter button 102 at the point of desired picture taking, will override the automatic sequence and snap the picture at that moment. The audio recording will then continue until all ten seconds of audio have been recorded. Depressing shutter button 102 a third time within this ten-second duration terminates audio recording, advances film to the next shot, and switches operation to the Action mode.

The Flash selection is active only in the Automatic or Manual modes. Flash allows the user to preset the shutter to be automatically actuated anywhere from the beginning to the end of the ten second audio recording. For instance if set at 0%, the shutter is actuated immediately upon depressing shutter button 102, and ten seconds of audio is recorded after the picture. When preset at the 100%, audio recording will initiate immediately upon depressing shutter button 102 and the shutter will be actuated ten seconds later.

Narration is possible only in the Manual mode. This allows the recording of a "second track" of audio which may be previewed, re-recorded, mixed, and written to film along with the natural sound (illustrated above).

Balance or mix functions are active only in the Manual mode. This adjustment specifies the proportions of natural and narrative audio to be mixed together upon imprinting to film in the event they overlap (not illustrated).

Edit functions are possible only in the Manual mode. This allows the user to trim and manipulate the natural audio prior to imprinting to film. Edit functions may be combined with narration (as illustrated above).

An exposed roll of film is processed as usual, using standard procedures, equipment, and products.

FIG. 5 — Perspective View of Device for Reading Audio Information From Photographs To play the audio recorded on a photograph, the user slides the audio portion of a photograph through slot 120 in reader 110 in a right-to-lea direction, similar to the way clerks slide credit cards through readers. After the user moves the photo through the slot, the ten-second audio recording will play, regardless of the speed the photo is moved or the duration of the movement process.

Once guide track 132*d* reaches optical guide sensors 112*d* and 112*e*, optical sensor transport 112 will center itself with the track, optimizing all other information.

FIG. 7 — Optical Sensor Transport 112 Aligned With Audio Tracks of Photograph As shown in FIG. 7, when properly centered, guide track 132*d* is positioned between guide sensors 112*d* and 112*e*. In this alignment, guide track 132*d* is not detected by either guide sensor 112*d* nor 112*e* and no action is taken. If guide track 132*d* is detected by guide sensor 112*d*, motor controller 118 (FIG. 8) activates transport motor 114 to move optical sensor transport 112 up. If guide track 132*d* is detected by guide sensor 112*e*, motor controller 118 (FIG. 8) activates transport motor 114 to move optical sensor transport 112 down.

FIG. 8 — Perspective View of Reading Device 110

As shown in FIG. 8, optical transport movement is accomplished when pinion 115 is rotated by transport motor 114. This rotation causes optical transport 112 to rise or descend. These actions are stabilized by tower bushings 117a and 117b riding against transport towers 116a and 116b.

This centering process properly aligns all optical sensors with the associated tracks.

Optical sensors 112a, 112b, and 112c (FIG. 7) detect the changes in reflectance between the exposed and non-exposed areas of associated tracks 132a, 132b and 132c as they pass. A succession of electronic pulses replicating these changes is created within audio processor 122, recreating the original On/Off digital binary code of each track.

FIG. 12 — Electrical Flow Chart of Reading Device 110

As illustrated in FIG. 12, the pulses generated by optical clock sensor 112c flow into audio processor 122 where they supply an external clock or time base.

Using this external time base, the audio information is read from tracks 132a and 132b, processed, and stored in a solid-state circuit within audio processor 122. When the reading is complete, the audio can then be played, heard, and replayed until such time as audio from another photo replaces it. This audio playing is accomplished by reassembling the two audio portions (A and B), and utilizing the real-time internal clock, digital-to-analog audio converter, and amplifier contained within audio processor 122. The sound is made audible by way of speaker 123. These operations are controlled by a multifunction On/Off-volume-repeat switch 124 and tone controller 126.

Audio processor 122 is electrically connected to photographic receptacle interface connector 127.

FIG. 9 — Perspective View of Storage Receptacle 139 for Photographs Which Contain Audio By connecting interface cable 127a (FIG. 8) to photographic receptacle interface connector 127, and to reader interface connector 152 (FIG. 9), communication is established between the two devices, and the transfer of audio information from reader 110 to photographic receptacle 139 is made possible.

The installation of photographs into receptacle 139 is as follows. With On/Off switch 144 in the On position, receptacle 139 is connected to reader 110 by way of interface cable 127a as described above. A photo is passed through slot 120 of reader 110, and audio is read as previously described. Upon completion of the read, the audio is played back for operator verification. A signal is then sent to receptacle 139, indicating audio information is ready to be transferred. Since receptacle 139 holds many photographs, a specific slot is selected and this photo inserted. This example uses photo slot 154a.

Adjacent to photo slot 154a is a photo slot assignment trigger 156a which identifies the unique solid-state memory address assigned to photo slot 154a. Upon depressing photo slot address trigger 156a, a signal is sent from receptacle 139 to reader 110, and audio information from reader 110 is transferred to receptacle 139. This specific audio information is transferred into solid-state audio memory unit 140 and given the address relating to photo slot 154a.

This installation process may be repeated for all slots in photo receptacle 139.

A specific photo may be selected by touching the transparent vinyl sleeve covering the desired photo. This touching interrupts a static electric or other field above or otherwise adjacent to a photo. If this field adjacent to photo slot 154a is interrupted, it will initiate playback of the audio information relative to that address. Furthermore, interrupting the static field adjacent to any photo address slot will immediately access and play the appropriate audio information.

The uses for this system include, but are not limited to documenting activities, storing the sound of a loved ones voice for future generations, recording a baby's first words, adding emotional quality to communications, verifying a transaction, confirming an identity, capturing feelings, words, and sounds, or simply making audio notes pertaining to the photo itself that will be useful later.

This system and its equipment are compatible with current photographic processes and supplies, so it can be implemented without need of special film, handling, developing, paper, or printing.

This system can accommodate virtually all users. For the technology shy, this system offers almost transparent operation, which allows the user to take photos as previously—ignoring the audio recording feature. The other end of the operation scale enables the more adventurous user to preview, edit, and narrate over each shot prior to advancing to the next.

Conclusion, Ramifications and Scope

Thus, the reader will see that this sound system for still film photography conveniently, efficiently, economically, and reliably allows the photographer to include an accurate and permanent audio recording of any photographic occasion. In addition, this system maintains the superior imaging quality, ease of operation and convenience of film photography.

This system combines the visual image with recorded audio inside the camera, which eliminates the encumbrance of separate recording mediums, and the cost and labor involved in combining separate elements. In addition, this system of audio inclusion on photographs affords the user easy duplication of audio and visual information using traditional equipment and suppliers.

This inclusion of audio greatly improves the documentation, story telling, and memory stimulation features of photographs, these being the primary purposes of still photography. These improvements are gained with no need for the additional precautions associated with a magnetic medium.

While the above description contains many specificities, these should not be construed as limitation on the scope of the invention, but rather as an exemplification of one preferred embodiment. Many other variations are possible.

For example, in the camera it is possible to write the audio information as an analog waveform instead of a digital binary code. A different portion of the photograph can be used to store this information, and the contrast used to print this information can be between colors, rather than by luminance or reflectance. A shutter mechanism can be placed between a light emitter and the film. Rather than switching the supply voltage to the emitters, this shutter can be used to regulate exposure. The number of audio emitters and subsequent audio tracks, can be varied to increased or decreased the duration of audio recorded. A stationary writing block can be replaced by a scanning electronic beam. If a scanning beam is utilized, the temporary solid-state storage can be bypassed or eliminated. An array of various indicators, tallies, and status signals can also be added. The tachometer can take the form of a pinch roller mounted elsewhere in the camera chassis. A film can be produced which already contains a type of clock track that is read by the camera.

The resolution of the film directly effects the density of the audio information that can be stored. The higher the resolution of the film, the more densely the information may be stored. To enhance photographic versatility and improve audio quality, low-resolution film can include a high-resolution strip for audio recording.

In the reader, along with rearranging the optical sensor army, different optical transport configurations are possible. The alignment of the optical transport can include a skew or tilt adjustment. A skew or tilt adjustment may also be utilized to accommodate several sizes of photographic prints. Another reader embodiment can eliminate the sliding of the photograph through the reader, and operate by means of inserting the photograph into a slot and have the optical transport move past it. The optical transport can be eliminated by incorporating a scanning electronic beam. If a moving optical block or scanning beam are incorporated, the system can be adapted to be used with slides and slide projectors.

Other photo receptacle embodiments can include a different photo capacity, and/or alternative means of selecting audio addresses. The photo receptacle can be shaped as a hanging or free-standing frame, and hold any number of photographs and related audio.

Other functions or operations of any or all of the devices listed may be separated or combined to reflect new technological advances or knowledge.

Thus the scope of the invention should be determined by the appended claims and their legal equivalents, rather than by the examples given.

I claim:

1. A system for concurrently and contiguously recording, onto a light-sensitive film, a visual image and associated audio related information, said system comprising:

(a) recording means for recording said visual image onto a section of said light-sensitive film, (b) gathering means for gathering sound from an area in proximity to said recording means, (c) translating means for translating said sound into an electrical audio signal representative of said sound, (d) storage means for temporarily storing a predetermined duration of said electrical audio signal, (e) conveyance means for moving said light-sensitive film past a fixed station, (f) determining means for determining the rate of speed at which said light-sensitive film moves past said fixed station, (g) imprinting means for imprinting onto said section of said light-sensitive film, said electrical audio signal as stored, said imprinting means being arranged to create a longitudinal track of information as a series of light and dark contrasting areas adjacent said visual image as recorded, (h) adjusting means for adjusting the rate of said imprinting of said electrical audio signal as stored, to a rate of imprinting corresponding to said rate of speed at which said light-sensitive film moves past said fixed station, (i) imprinting means for concurrently imprinting a second signal representative of said rate of speed said electrical audio signal is imprinted onto said section of said light-sensitive film, at a predetermined position relative to said electrical audio signal as imprinted, said second signal being imprinted as a series of light and dark contrasting areas in a longitudinal direction, and (j) imprinting means for imprinting an alignment reference onto said section of said light-sensitive film as a light and dark contrasting area adjacent said electrical audio signal as imprinted, said imprinting occurring at a predetermined position relative to said electrical audio signal as imprinted, whereby the minimum size of all said audio related information as imprinted, is limited only by the resolution of said light-sensitive film, and said imprinting of said audio related information and said moving of said light sensitive film, can occur at a variable rate of speed.

2. The system of claim 1 wherein said means for recording said visual image onto said section of said light-sensitive film is a 35 mm single-lens-reflex camera.

3. The system of claim 1 wherein said light-sensitive film is a 35 mm color negative film.

4. The system of claim 1 wherein said electrical audio signal is a digital binary code.

5. The system of claim 1, further including means for monitoring and controlling, in accordance with said recording of said audio related information, a plurality of functions of said means for recording said visual image.

6. The system of claim 1, further including a system for accessing said audio related information as imprinted onto said light-sensitive film, after said light sensitive film has been developed and printed onto a photographic paper, said system comprising:

(a) accessing means for concurrently accessing said electrical audio signal as printed, and said second signal as printed onto said photographic paper, (b) conveyance means for moving said photographic paper in a longitudinal direction past said accessing means, (c) alignment means for aligning said accessing means to a predetermined position relative to said audio related information as printed onto said photographic paper as said photographic paper moves in said longitudinal direction past said accessing means, (d) a temporary storage medium for temporarily storing said electrical audio signal as accessed, (e) a temporary storage medium for temporarily storing said second signal as accessed, (f) transforming means for transforming said second signal as stored, to a time base representative of said predetermined duration, (g) transforming means for transforming said electrical audio signal as stored to an audible form, and (h) regulating means for regulating rate of said transforming of said electrical audio signal as stored to said audible form, said rate of said transforming being dictated by said time base, said audible form being representative of said sound having said predetermined duration, whereby said accessing of said audio related information, and said moving of said photographic paper can occur a variable rate of speed.

7. The system of claim 6 wherein said alignment means includes a sensing device positioned to read said alignment reference as printed onto said photographic paper, as said photographic paper moves in said longitudinal direction past said sensing device, and further including maintaining means for maintaining alignment of said sensing device, said maintenance means comprising:

(a) means for identifying a predetermined alignment position of said sensing device with said audio related information as printed, (b) means for identifying a current position of said sensing device relative to said predetermined alignment position, and (c) means for moving said sensing device to said predetermined alignment position.

8. A system for accessing audio related information imprinted concurrently and contiguously with a visual image onto a light-sensitive film, after said light sensitive film has been developed and printed onto a photographic paper, said imprinting of said audio information arranged as a series of light and dark contrasting areas in a longitudinal manner, said system comprising:

(a) accessing means for concurrently accessing an electrical audio signal representative of a sound having a predetermined duration, and a second signal representative of a ti me-base indicating said predetermined duration, as printed to said photographic paper, (b) conveyance means for moving said photographic paper in a longitudinal direction past said accessing means, (c) alignment means for aligning said accessing means to a predetermined position relative to said audio related information as printed onto said photographic paper, as said photographic paper moves past said accessing means in a longitudinal direction, (d) a temporary storage medium for temporarily storing said electrical audio signal as accessed, (e) a temporary storage medium for temporarily storing said second signal as accessed, (f) transforming means for transforming said second signal as stored, to a time base representative of said predetermined duration, (g) transforming means for transforming said electrical audio signal as stored to an audible form, and (h) regulating means for regulating rate of said transforming of said electrical audio signal as stored to said audible form, said rate of said transforming being dictated by said time base, said audible form being representative of said sound having said predetermined duration, whereby said accessing, and said transforming of said audio related information as printed, and said passing of said photographic paper can occur at a variable rate of speed.

9. The system of claim 8 wherein said alignment means includes a sensing device positioned to read said alignment reference as printed onto said photographic paper, as said photographic paper moves in said longitudinal direction past said sensing device, and further including maintaining means for maintaining alignment of said sensing device, said maintenance means comprising:

(a) means for identifying a predetermined alignment position of said sensing device with said audio related information as printed, (b) means for identifying a current position of said sensing device relative to said predetermined alignment position, and (c) means for moving said sensing device to said predetermined alignment position.

10. The system of claim 8 further including a system for concurrently and contiguously recording, onto said light-sensitive film, said visual image and said associated audio related information, said system comprising:

(a) recording means for recording said visual image onto a section of said light-sensitive film, (b) gathering means for gathering said sound from an area in proximity to said recording means, (c) translating means for translating said sound into said electrical audio signal representative of said sound, (d) storage means for temporarily storing said predetermined duration of said electrical audio signal, (e) conveyance means for moving said light-sensitive film past a fixed station, (f) determining means for determining the rate of speed at which said light-sensitive film moves past said fixed station, (g) imprinting means for imprinting onto said section of said light-sensitive film, said electrical audio signal as stored, said imprinting means being arranged to create a longitudinal track of information as a series of light and dark contrasting areas adjacent said visual image as recorded, (h) adjusting means for adjusting the rate of said imprinting of said electrical audio signal as stored, to a rate of imprinting corresponding to said rate of speed at which said light-sensitive film moves past said fixed station, (i) imprinting means for concurrently imprinting said second signal representative of said rate of speed said electrical audio signal is imprinted onto said section of said light-sensitive film, at a predetermined position relative to said electrical audio signal as imprinted, said second signal being imprinted as a series of light and dark contrasting areas in a longitudinal direction, and (j) imprinting means for imprinting an alignment reference onto said section of said light-sensitive film as a light and dark contrasting area adjacent said electrical audio signal as imprinted, said imprinting occurring at a predetermined position relative to said electrical audio signal as imprinted.

whereby the minimum size of all said audio related information as imprinted, is limited only by the resolution of said light-sensitive film, and said imprinting of said audio related information and said moving of said light sensitive film, can occur at a variable rate of speed.

11. The system of claim 10 wherein said means for recording said visual image onto said section of said light-sensitive film is a 35 mm single-lens-reflex camera.

12. The system of claim 10 wherein said light-sensitive film is a 35 mm color negative film.

13. The system of claim 10 wherein said electrical audio signal is a digital binary code.

14. The system of claim 10, further including means for monitoring and controlling, in accordance with said recording of said audio related information, a plurality of functions of said means for recording said visual image.

15. A system for containing photographic images in a sleeve, along with recorded audio segments which pertain to said images, so as to allow a user to randomly identify and play a prerecorded audio segment for any photographic image by touching a portion of said sleeve which contains said image, comprising:

(a) a sleeve for storing a plurality of photographic images, (b) means for storing a plurality of audio segments, (c) means for randomly accessing any of said segments, (d) means for associating said audio segments with their respective photographic images, (e) means for monitoring a status of an electrical field adjacent to said sleeve, and (f) means for identifying any significant disruption of said electrical field to indicate said user's selection of said photographic image, whereby said user can easily select and make audible the audio segment associated with any selected image.

16. The system of claim 15 wherein said system for holding photographic images comprises a plurality of sleeves bound into a book.

17. The system of claim 15 wherein said means for storing audio segments comprises a solid-state circuit.

18. The system of claim 15 wherein said sleeve is made of transparent vinyl.

19. The system of claim 15 wherein said electrical field is a static electric field.

* * * * *